(12) United States Patent
Angeletti et al.

(10) Patent No.: US 9,876,546 B2
(45) Date of Patent: Jan. 23, 2018

(54) DIGITAL BEAM-FORMING NETWORK HAVING A REDUCED COMPLEXITY AND ARRAY ANTENNA COMPRISING THE SAME

(71) Applicant: AGENCE SPATIALE EUROPÉENNE, Paris (FR)

(72) Inventors: Piero Angeletti, The Hague (NL); Marco Lisi, Rome (IT)

(73) Assignee: AGENCE SPATIALE EUROPÉENNE, Paris (FR)

( * ) Notice: Subject to any disclaimer, the term of this patent is extended or adjusted under 35 U.S.C. 154(b) by 0 days.

(21) Appl. No.: 15/103,498

(22) PCT Filed: Dec. 20, 2013

(86) PCT No.: PCT/IB2013/003261
§ 371 (c)(1),
(2) Date: Jun. 10, 2016

(87) PCT Pub. No.: WO2015/092478
PCT Pub. Date: Jun. 25, 2015

(65) Prior Publication Data
US 2016/0315677 A1 Oct. 27, 2016

(51) Int. Cl.
*H04B 7/04* (2017.01)
*H04B 7/0456* (2017.01)
(Continued)

(52) U.S. Cl.
CPC ............ *H04B 7/0456* (2013.01); *H01Q 3/26* (2013.01); *H04L 27/2665* (2013.01)

(58) Field of Classification Search
CPC ..... H04B 7/0456; H04L 27/2665; H01Q 3/26
See application file for complete search history.

(56) References Cited

U.S. PATENT DOCUMENTS

| | | | | |
|---|---|---|---|---|
| 4,584,581 A | * | 4/1986 | Teshirogi | H01Q 25/00 327/231 |
| 2011/0102263 A1 | * | 5/2011 | Angeletti | H01Q 3/40 342/373 |

(Continued)

FOREIGN PATENT DOCUMENTS

| | | |
|---|---|---|
| EP | 2 296 225 A1 | 3/2011 |
| EP | 2 632 058 A1 | 8/2013 |
| GB | 2 318 915 A | 5/1998 |

OTHER PUBLICATIONS

International Search Report dated Sep. 2, 2014, issued in corresponding International Application No. PCT/IB2013/003261, filed Dec. 20, 2013, 3 pages.

*Primary Examiner* — Kenneth Lam
(74) *Attorney, Agent, or Firm* — Christensen O'Connor Johnson Kindness PLLC

(57) ABSTRACT

A digital beam-forming network for an array antenna having N>1 antenna ports, to be associated to respective antenna elements, and M≥1 beam ports (BP), corresponding to respective antenna beams. The digital beam-forming network comprises a plurality of complex weighting elements interconnected through summing nodes. At least one of the complex weighting elements is connected to either two antenna ports, to be associated with respective antenna elements which are arranged symmetrically with respect to the symmetry axis, or two beam ports corresponding to respective antenna beams pointing toward directions which are symmetrical with respect to the symmetry axis, or both. The digital beam forming network can be a part of an array antenna comprising N antenna elements, $N_S$ of which are arranged according to an array pattern having a symmetry axis, $N_S$ being an even integer different from zero.

15 Claims, 15 Drawing Sheets

(51) Int. Cl.
*H01Q 3/26* (2006.01)
*H04L 27/26* (2006.01)

(56) References Cited

U.S. PATENT DOCUMENTS

| | | | | |
|---|---|---|---|---|
| 2012/0274499 A1* | 11/2012 | Chang | ........................ | G01S 7/42 |
| | | | | 342/107 |
| 2013/0050023 A1* | 2/2013 | Oster | ................... | H04B 7/2041 |
| | | | | 342/373 |
| 2014/0104107 A1* | 4/2014 | Mangenot | ................ | H01Q 3/26 |
| | | | | 342/371 |

* cited by examiner

DIGITAL BEAM-FORMING NETWORK HAVING A REDUCED COMPLEXITY AND ARRAY ANTENNA COMPRISING THE SAME

The invention relates to a digital beam-forming network for an array antenna, and to an array antenna comprising the same.

The invention is primarily, but not exclusively, intended for space applications.

Array antennas find application in communications, remote sensing (e.g. real and synthetic RF instruments such as radars, radiometers, altimeters, bi-static reflectometry and radio occultation receivers for signals-of-opportunity missions, etc.), electronic surveillance and defense systems (e.g. air traffic management and generally moving target indicator radars, electronic support measure and jamming systems for electronic warfare, RF instruments for interference analysis and geo-location, etc.), science (e.g. multibeam radio telescopes), satellite navigation systems (where multibeam antennas can be employed in the user and control segments and could, as well, extend space segment capabilities) [1].

In satellite communication systems, Direct Radiating Arrays (DRA) antennas are required to generate multiple spots in a cellular-like configuration, especially for point-to-point services making available higher gains and thus relaxing user terminals requirements. A beam-forming network (BFN) plays an essential role in DRAs antenna architectures [2]. More specifically, it performs the functions of:
  in an emitting antenna array, focusing the energy radiated by an array along one or more predetermined directions in space by opportunely phasing and weighting the signals feeding the radiating elements of the array; and
  in a receiving antenna array, synthesizing one or more receiving lobes having predetermined directions in space by opportunely phasing and weighting the signals received by the antenna elements of the array.

Today, most BFN are of the analog kind and comprise amplitude and phase control elements.

Digital technology is expected to constitute a pivotal ingredient of next generation satellite systems. Digital Beam-Forming (DBF) techniques have been successfully pioneered in the eighties for mobile narrowband applications and, nowadays, DBF is commercially available on several mobile satellites operating at L-band (e.g. INMARSAT 4 [3]). The continuous technological advance projects the use of DBF to the more demanding broadband communication systems of the years to come.

Advantages of a digital implementation include precision, predictability and freedom from factors such as ageing, drift and component value variations. DBF methods are also particularly appropriate to match the upcoming trend of digital on-board processing payloads.

In DFB, the amplitude and phase control elements of analog BFN realizations are replaced by complex multiplications and summations of the digitized signals.

In both the analog and digital cases, a fully populated BFN driving N antenna elements for generating M independent beams would require N·M control elements. The complexity of such a network would make it impractical for many applications: simpler solutions retaining sufficient (although not complete) flexibility are therefore necessary.

Reference [4] describes a fixed multiple-beam analog BFN based on the use of so-called "Butler matrices". A Butler matrix is a multiport network having N inputs and N outputs. The excitation of a single input induces equal amplitude signals on all the outputs, with a linear phase progression across the array. Therefore, each of the N input ports gives rise to an independent directive beam. The strategy that allows reducing the complexity of the BFN consists in factorizing the whole network in lower order networks. A systematic design procedure for a square network with a number of input/output ports equal to a power of 2 leads to a number of phase shifters equal roughly proportional to $$\frac{N}{2}$$

$\log_2 N$, while a non-factorized N·N BFN is composed by about $N^2$ phase shifters. This complexity reduction is directly equivalent to that obtained, in the field of digital signal processing, by using the Fast Fourier Transform (FFT) algorithm to evaluate the Discrete Fourier Transform (DFT), and indeed the Butler matrix can be seen as an analogical implementation of the FFT.

DBF techniques based on Fast-Fourier-Transforms (FFTs) on planar lattices are particularly well suited for periodic active arrays and have been recently implemented, tested and validated in a real-time proof-of-concept demonstrator [5].

The main drawback of the Butler/FFT BFN is related to the limited array geometries and beam lattices to which it can be applied.

Reference [6] describes an Intermediate Frequency (IF) analog multibeam BFN for an array antenna involving symmetry in the arrangement of antenna elements and/or the arrangement of beams, which allows reduction in the number of coupling resistors making up the resistive matrix and consequently in the size and weight of the network. This BFN is based on the use of an analog resistive matrix, and its operating principle cannot be applied to DBF architectures.

The present invention aims at providing a digital beam-forming network architecture having a reduced complexity compared to a "fully populated" network, while being scalable and capable of supporting various array geometries and beam configurations.

According to the invention, this aim is achieved by exploiting different types of symmetries in the element locations and beam pointing directions for reducing the complexity of a "fully populated" digital BFN.

An object of the present invention is a digital beam-forming network for an array antenna having N>1 antenna ports, to be associated to respective antenna elements, and M≥1 beam ports, corresponding to respective antenna beams, said digital beam-forming network comprising a plurality of complex weighting elements interconnected through summing nodes; characterized in that at least one of said complex weighting element is connected to either two antenna ports, to be associated to respective antenna elements which are arranged symmetrically with respect to a symmetry axis, or two beam ports corresponding to respective antenna beams pointing toward directions which are symmetrical with respect to a symmetry axis, or both.

Advantageously, each antenna port and each beam port can comprise an in-phase and a quadrature channel, respectively for a real and an imaginary part of a complex digital signal, and each complex weighting element can comprise four real weighting elements.

According to a first embodiment of the invention, the digital beam-forming network can have at least one complex weighting element interconnecting a first and second antenna ports, to be associated to respective antenna elements which are arranged symmetrically with respect to said symmetry axis, with a single beam port, and said or each said complex weighting element can comprise:

a first real weighting element interconnecting the in-phase channels of both said antenna ports with the in-phase channel of said beam port;

a second real weighting element interconnecting the quadrature channels of both said antenna ports with the in-phase channel of said beam port;

a third real weighting element interconnecting the in-phase channels of both said antenna ports with the quadrature channel of said beam port; and a fourth real weighting element interconnecting the quadrature channels of both said antenna ports with the quadrature channel of said beam port;

moreover:

the first and fourth real weighting elements, and the second and third real weighting elements, can have identical real weight; and sign-changing elements can be provided on the signal paths connecting the second real weighting element with the quadrature channel of said second antenna port and the third real weighting element with the in-phase channel of said first antenna port.

According to a second embodiment of the invention, the digital beam-forming network can have at least one complex weighting element interconnecting a single antenna port with a first and a second beam ports, corresponding to respective antenna beams pointing toward directions which are symmetrical with respect to said symmetry axis, and said or each said complex weighting element can comprise:

a first real weighting element, interconnecting the in-phase channel of said antenna port to the in-phase channels of both said beam ports;

a second real weighting element, interconnecting the quadrature channel of said antenna port to the in-phase channels of both said beam ports;

a third real weighting element, interconnecting the in-phase channel of said antenna port to the quadrature channels of both said beam ports; and a fourth real weighting element, interconnecting the quadrature channel of said antenna port to the quadrature channels of both said beam ports;

moreover:

the first and fourth real weighting elements, and the second and third real weighting elements, can have identical real weight; and sign-changing elements can be provided on the signal paths connecting the second real weighting element with the in-phase channel of said second beam port, the third real weighting element with the quadrature channel of said second beam port, and the third real weighting element with the in-phase channel of said antenna port.

According to a third embodiment of the invention, the digital beam-forming network can have at least one complex weighting element interconnecting a first and second antenna ports, to be associated to respective antenna elements which are arranged symmetrically with respect to said symmetry axis, with a first and a second beam ports, corresponding to respective antenna beams pointing toward directions which are symmetrical with respect to said symmetry axis, and said or each said complex weighting element can comprise:

a first real weighting element interconnecting the in-phase channels of both said antenna port with the in-phase channels of both said beam ports;

a second real weighting element interconnecting the quadrature channels of both said antenna port with the in-phase channels of both said beam ports;

a third real weighting element interconnecting the in-phase channels of both said antenna port with the quadrature channels of both said beam ports; and a fourth real weighting element interconnecting the quadrature channels of both said antenna port with the quadrature channels of both said beam ports;

moreover:

the first and fourth real weighting elements, and the second and third real weighting elements, can have identical real weight; and sign-changing elements can be provided on the signal paths connecting the second real weighting element with the quadrature channel of said second antenna port, the second real weighting element with the in-phase channel of the second beam port, the third real weighting element with the in-phase channel of said first antenna port and the third real weighting element with the quadrature channel of said second beam port.

The digital beam-forming network can comprise a first set of $M_A \cdot N_A$ complex weighting elements interconnecting a single antenna port with a single beam port, a second set of $(M_S/2) \cdot N_A$ complex weighting elements interconnecting a single antenna port with two beam ports, corresponding to respective antenna beams pointing toward directions which are symmetrical with respect to said symmetry axis, a third set of $M_A \cdot (N_S/2)$ complex weighting elements interconnecting a single beam port with two antenna ports, to be associated to respective antenna elements which are arranged symmetrically with respect to said symmetry axis, and a third set of $(M_S/2) \cdot (N_S/2)$ complex weighting elements interconnecting two antenna ports, to be associated to respective antenna elements which are arranged symmetrically with respect to said symmetry axis, with two beam ports, corresponding to respective antenna beams pointing toward directions which are symmetrical with respect to said symmetry axis; wherein $M_S$, $M_A$, $N_S$ and $N_A$ are even integers and wherein $N_S+N_A=N$ and $M_S+M_A=M$. $M_S$ or $N_S$ can be zero, but not both, otherwise the beam-forming network would reduce to the fully-populated case.

The inventive beam-forming network can be used in both transmission and reception. In the transmit case, said antenna ports are input ports and said beam ports are output ports, and complex weighting elements associated to a same beam ports are interconnected through summing nodes. In the receive case, said beam ports are input ports and said antenna ports are output ports, and complex weighting elements associated to a same antenna ports are interconnected through summing nodes.

In reconfigurable embodiments, said complex weighting elements can have adjustable complex weights.

Another object of the invention is an array antenna comprising N antenna elements, $N_S$ of which are arranged according to an array pattern having a symmetry axis, $N_S$ being an even integer different from zero, and a digital beam-forming network as described above.

Additional features and advantages of the present invention will become apparent from the subsequent description, taken in conjunction with the accompanying drawings, wherein.

Figure 4:
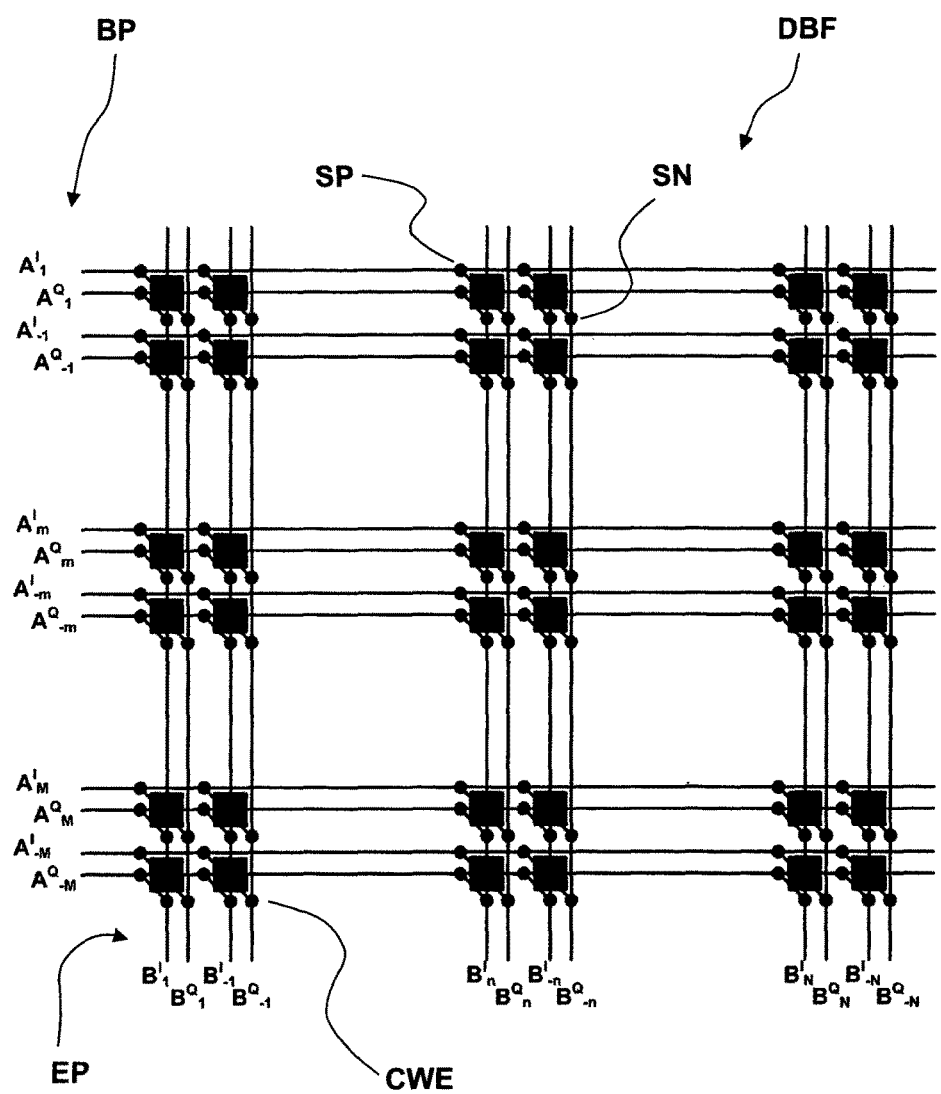
Figure 5:
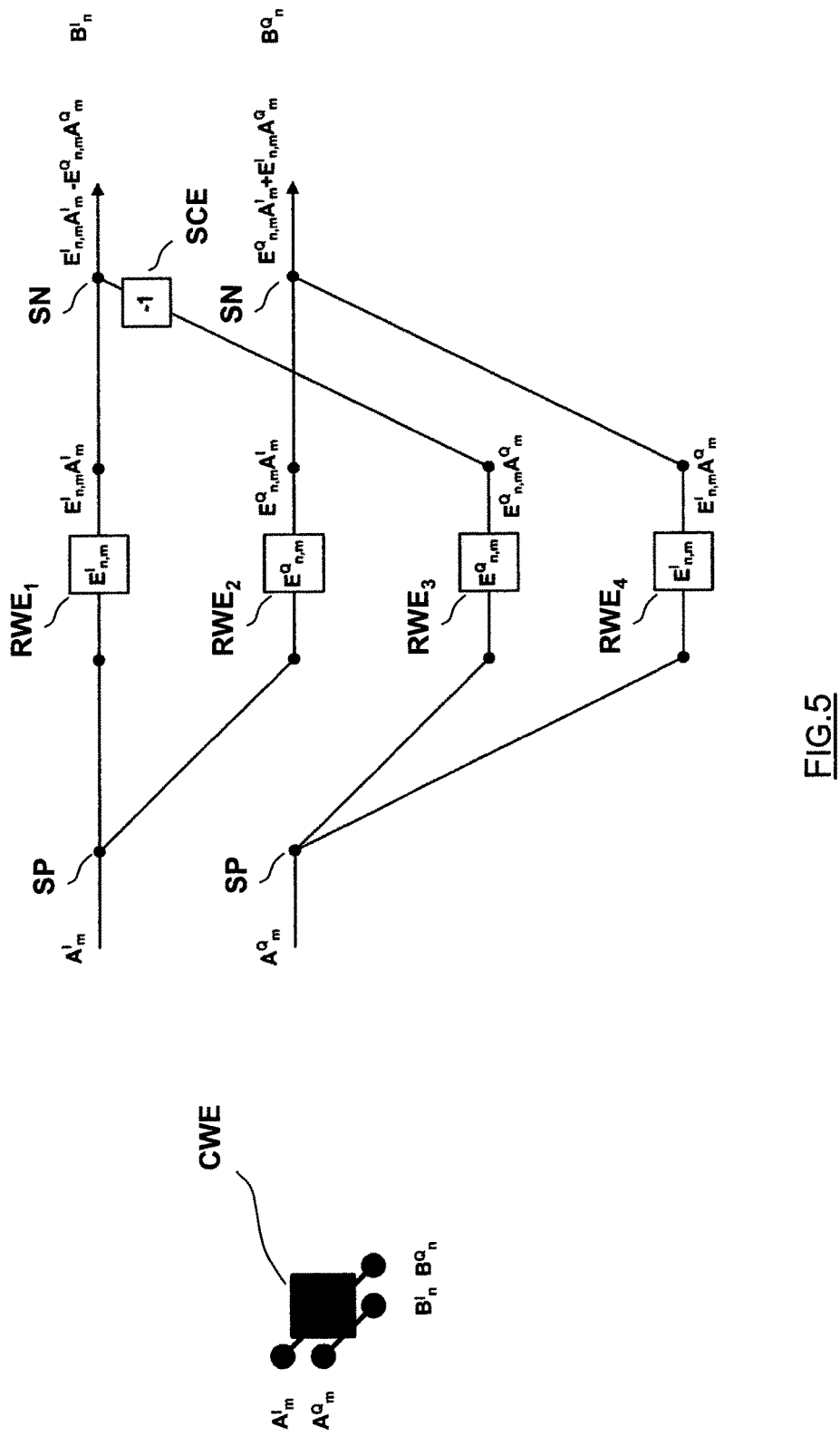
Figure 6:
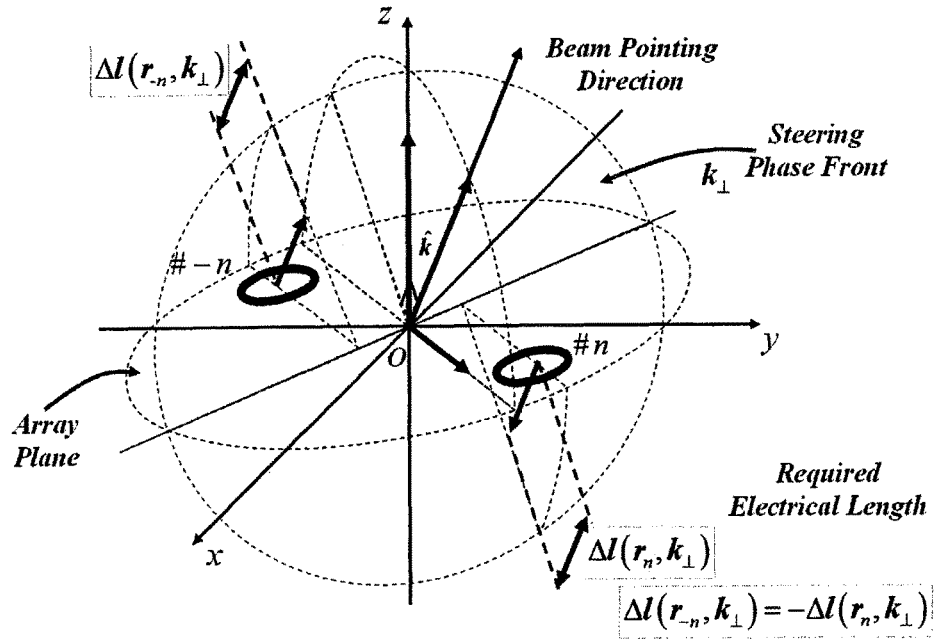
Figure 7:
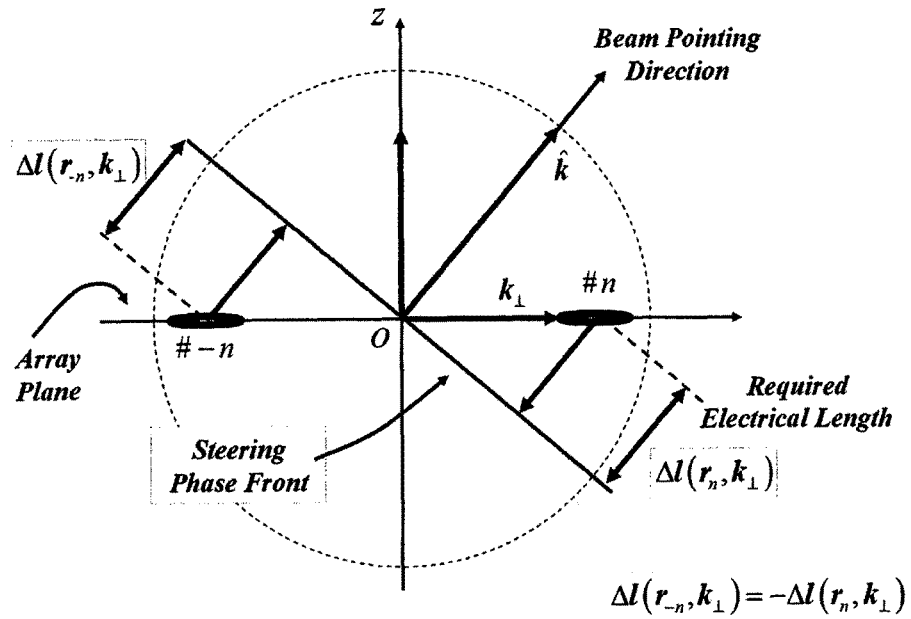
Figure 8:
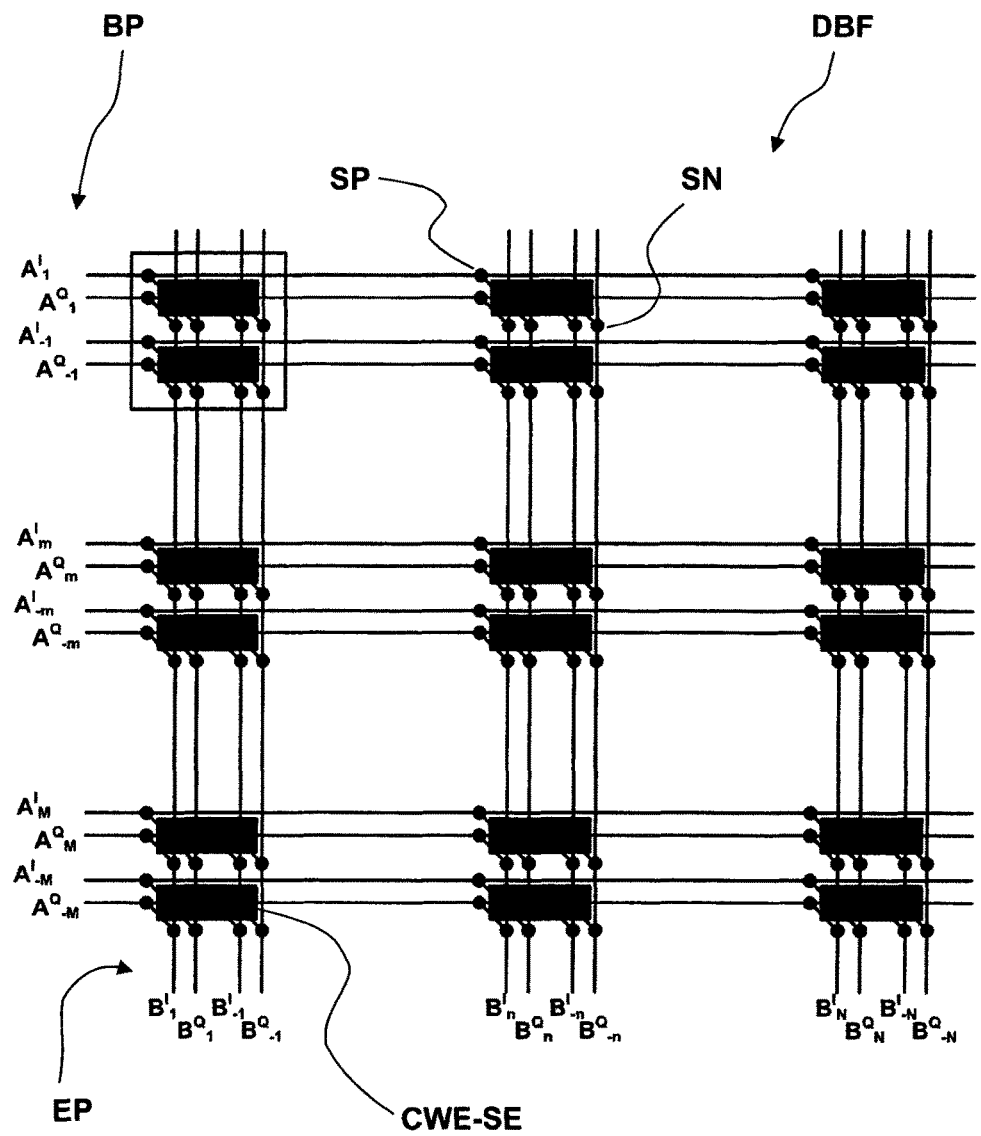
Figure 9:
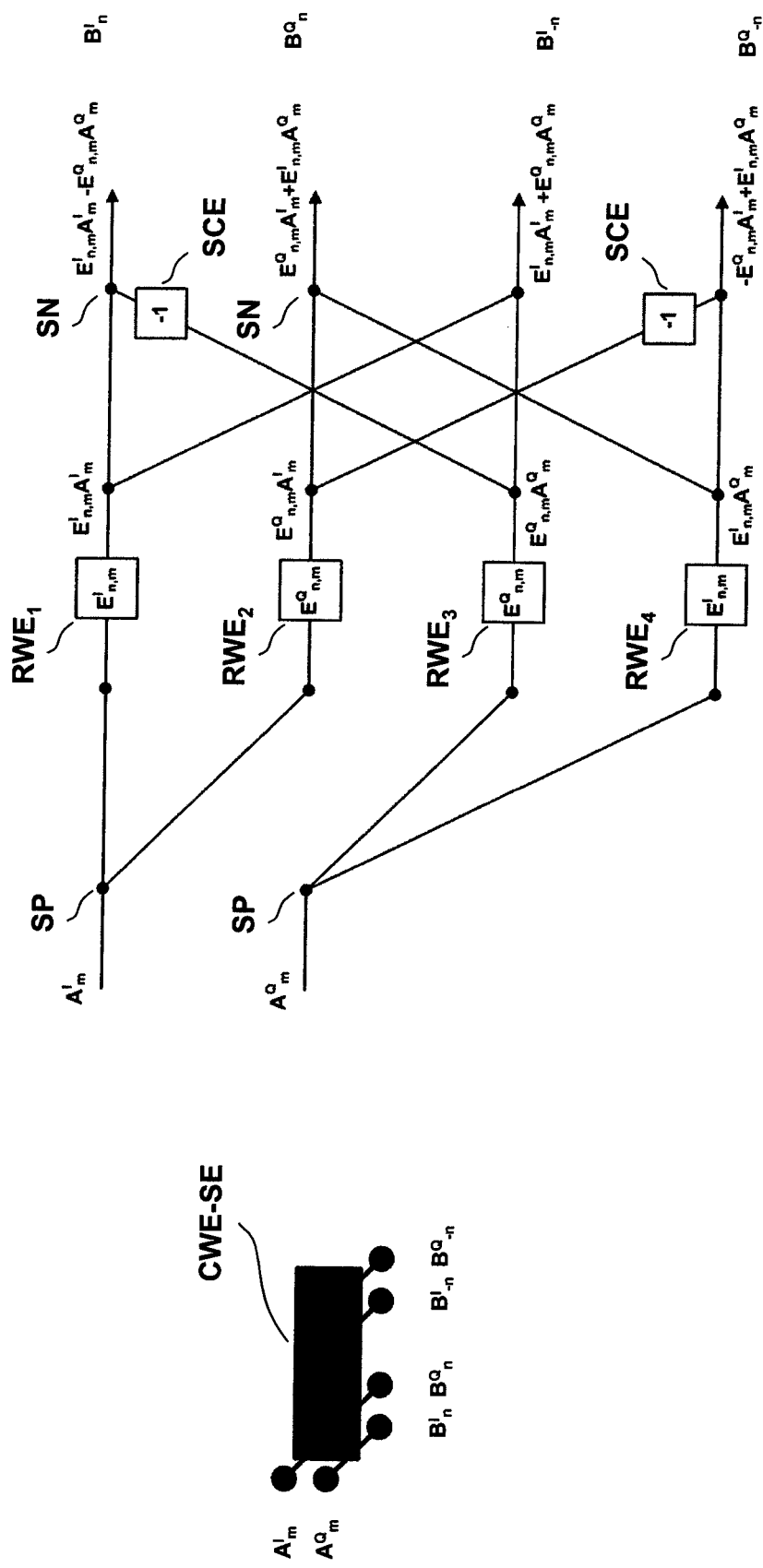
Figure 10:
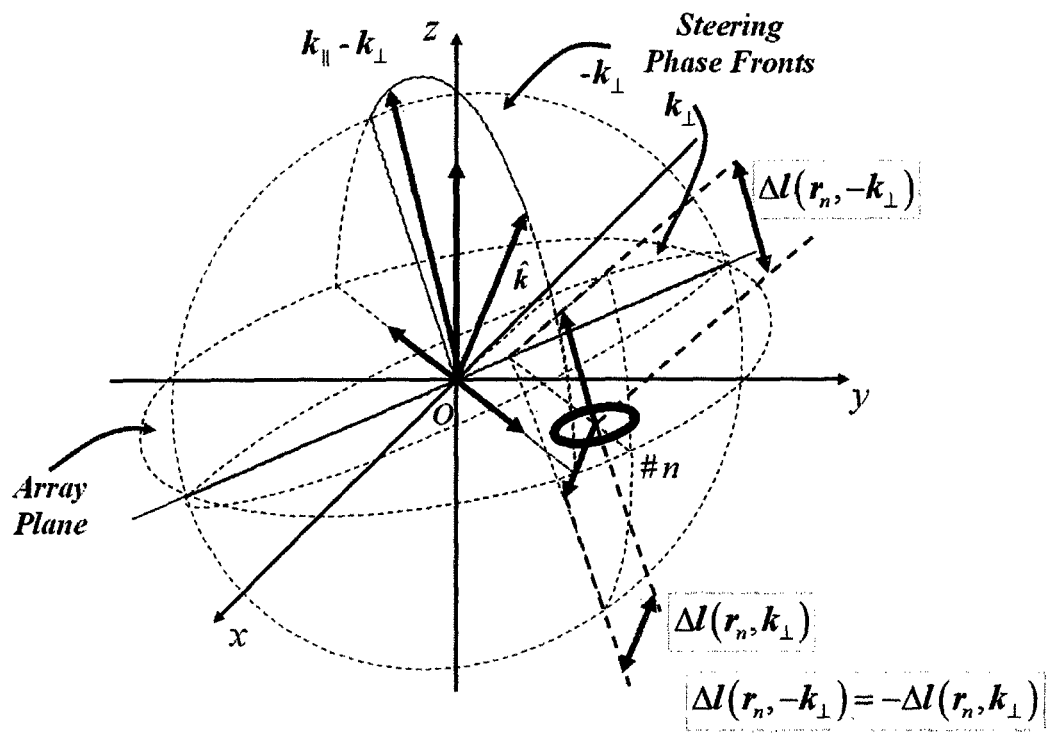
Figure 11:
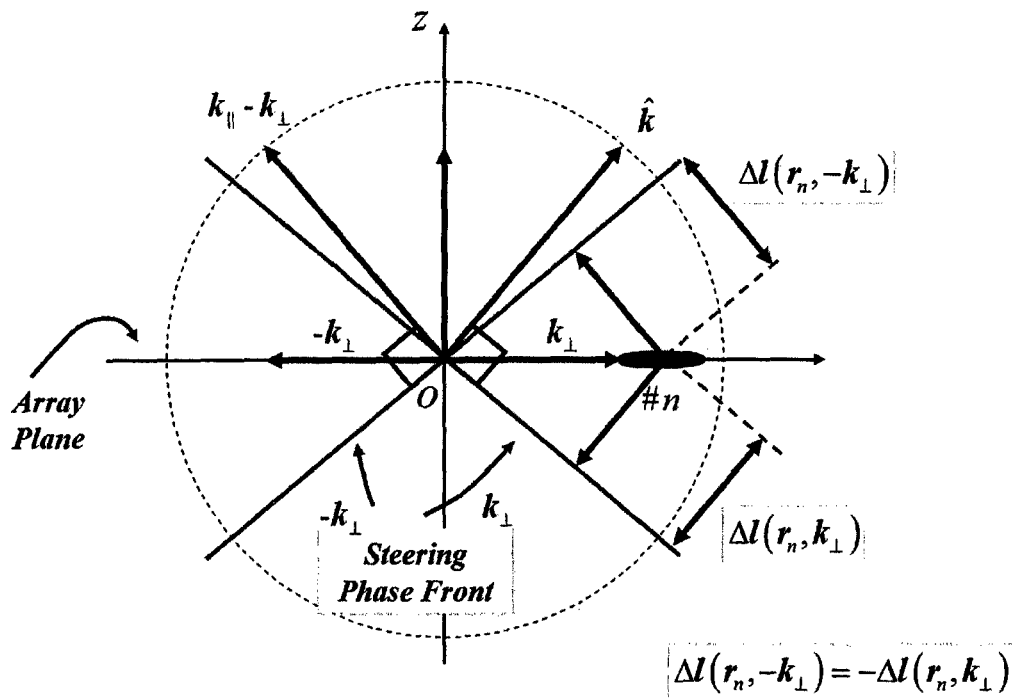
Figure 12:
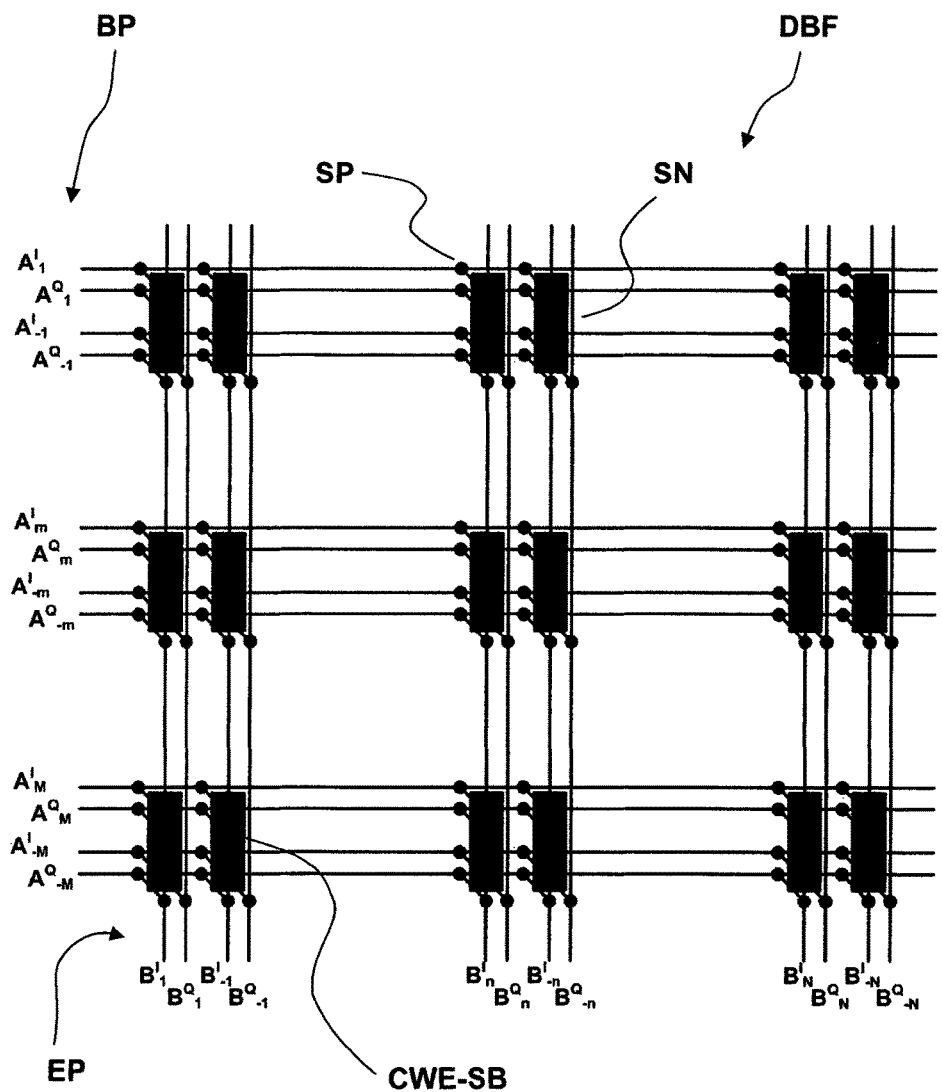
Figure 13:
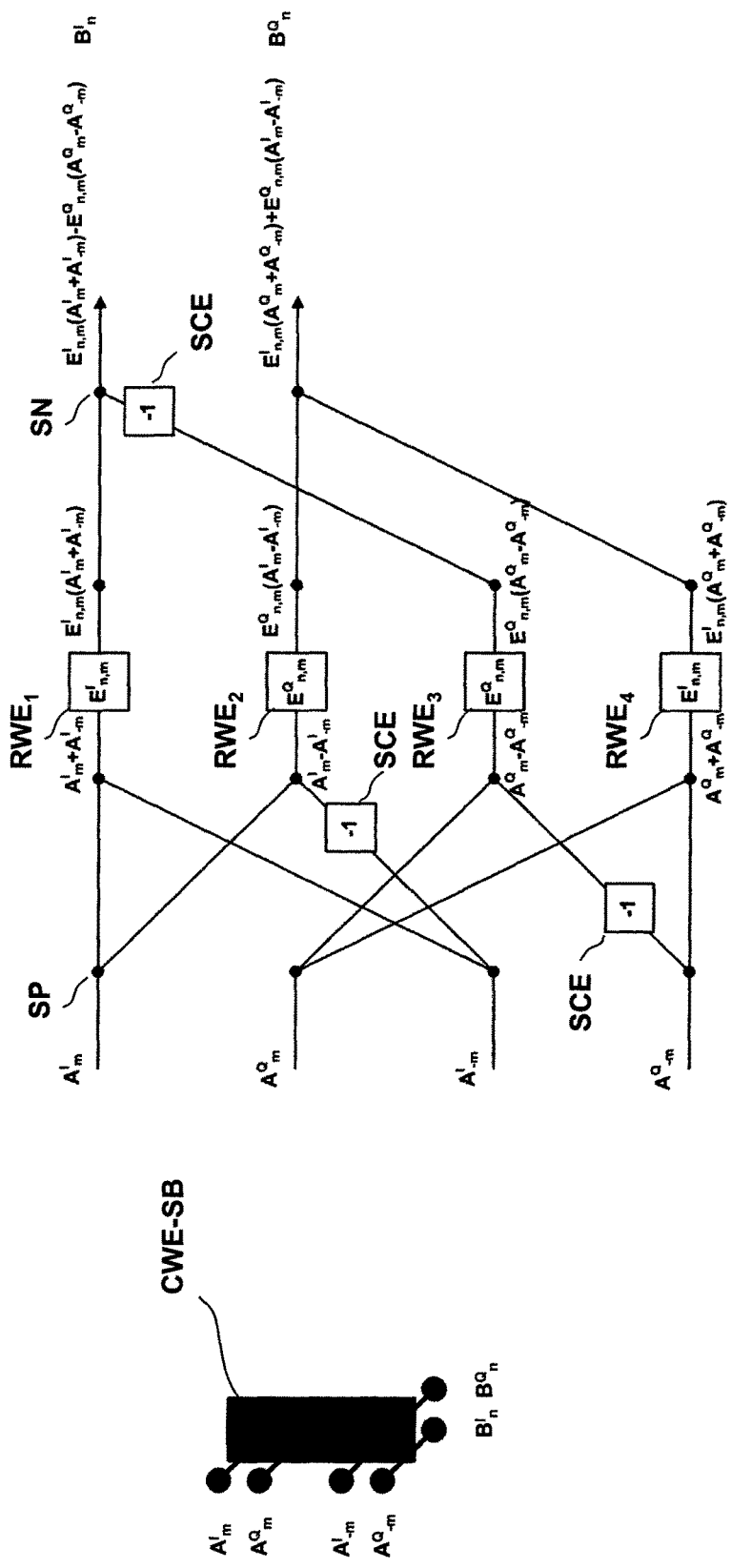
Figure 14:
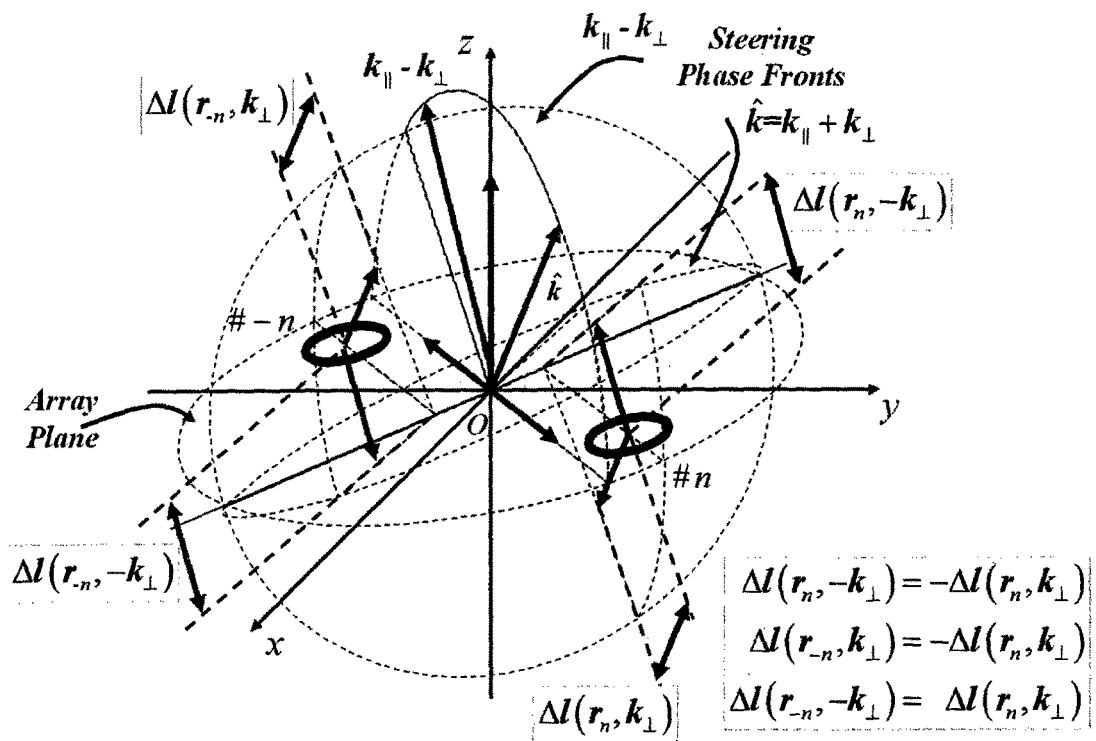
Figure 15:
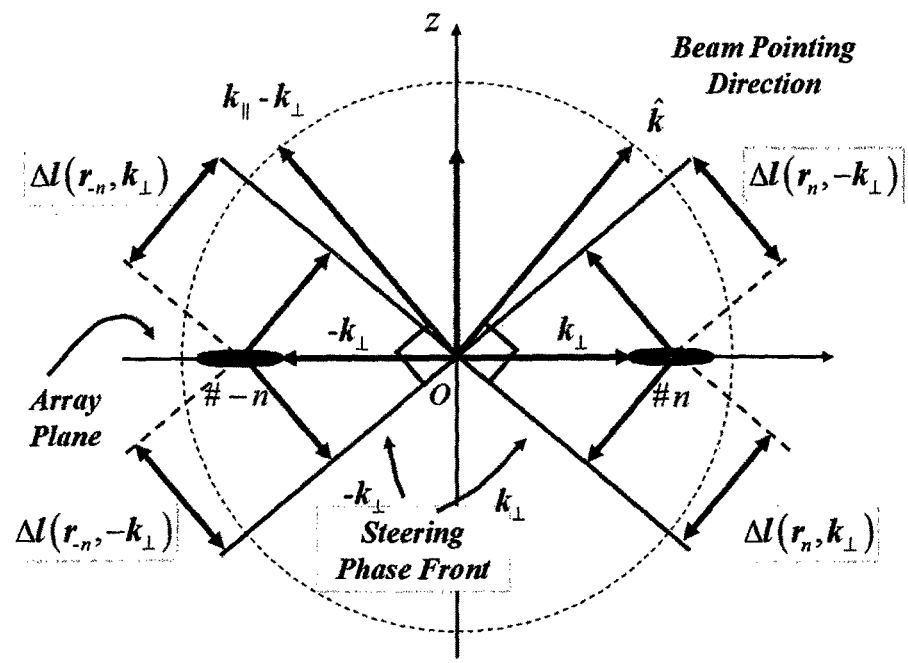
Figure 16:
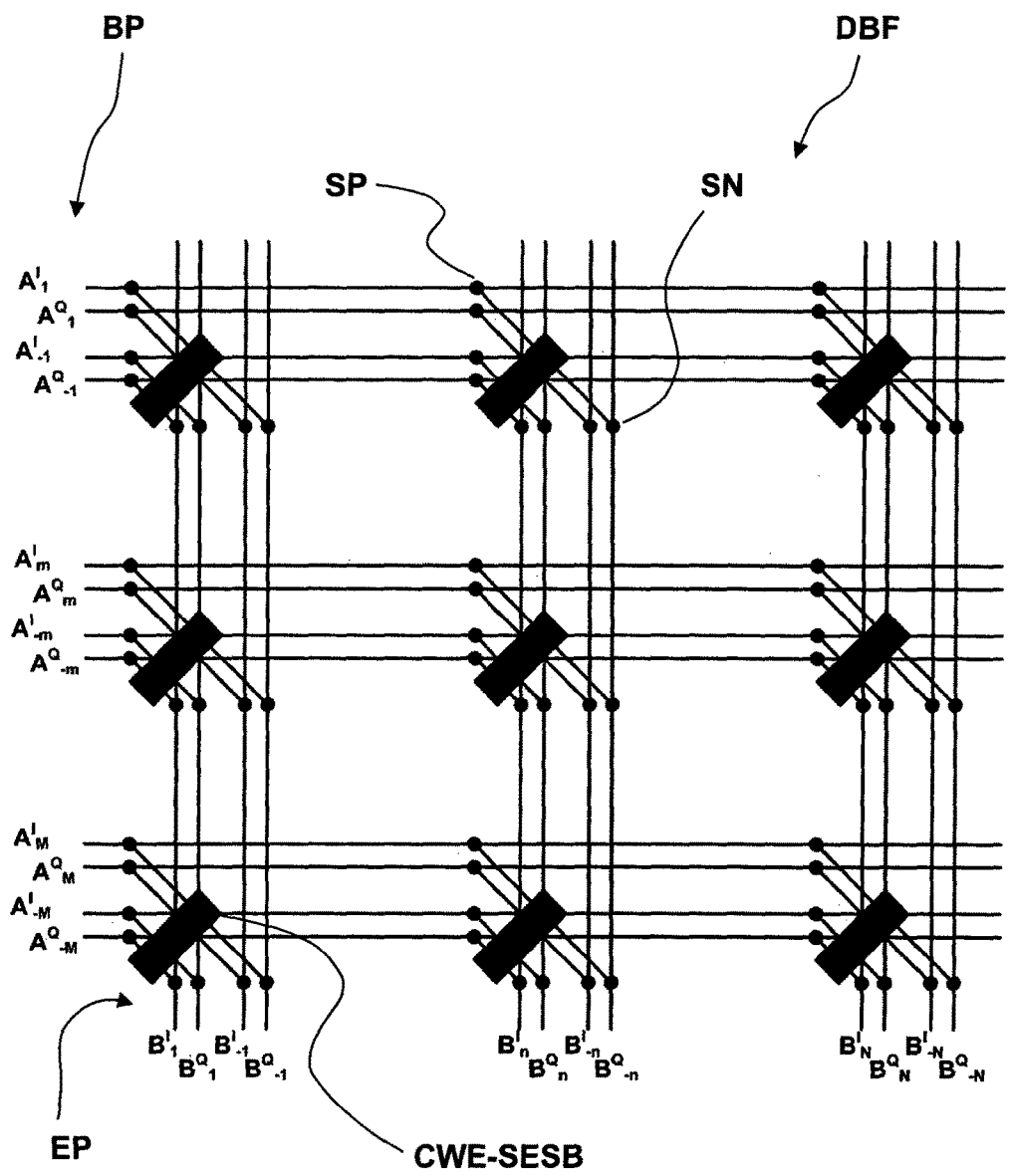
Figure 17:
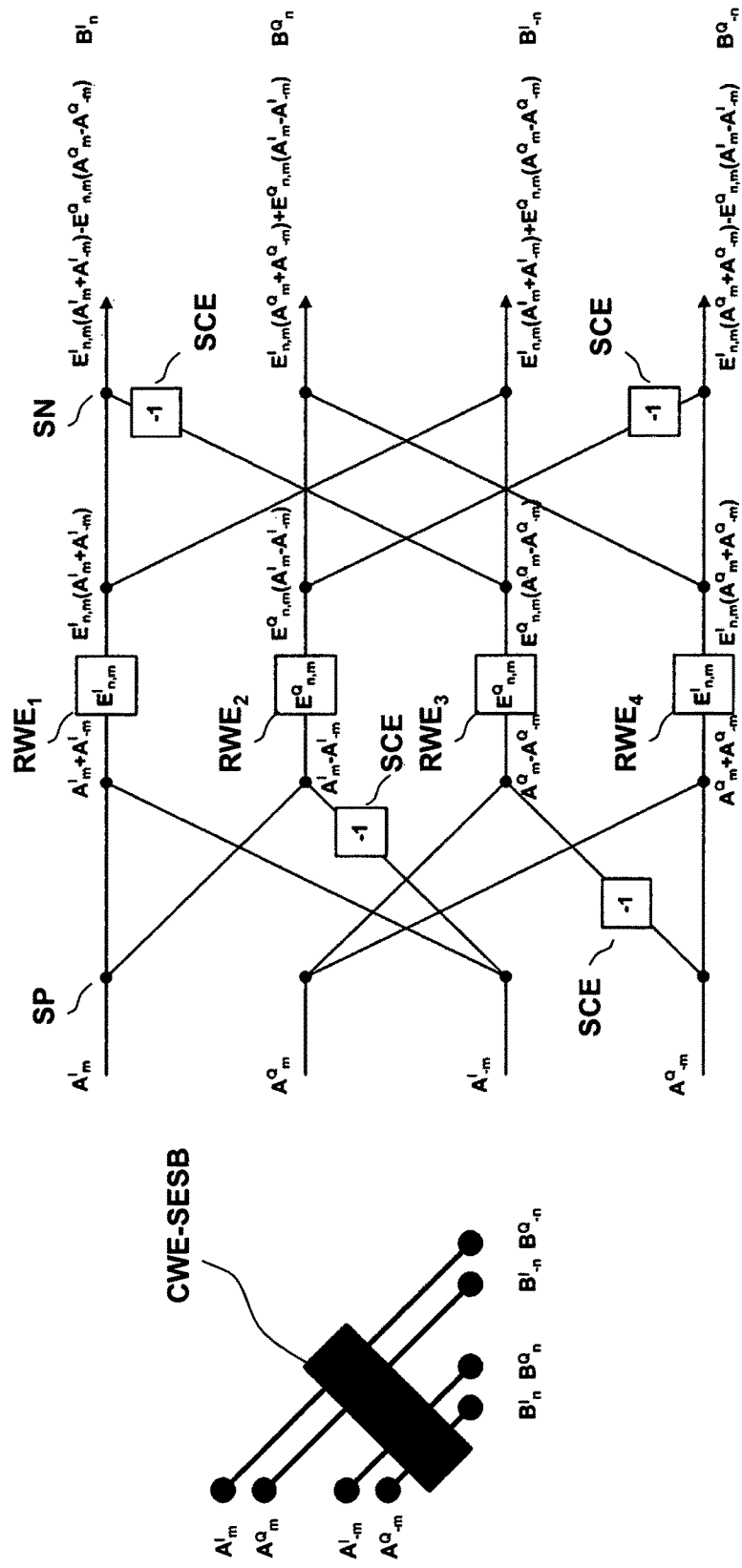
Figure 18:
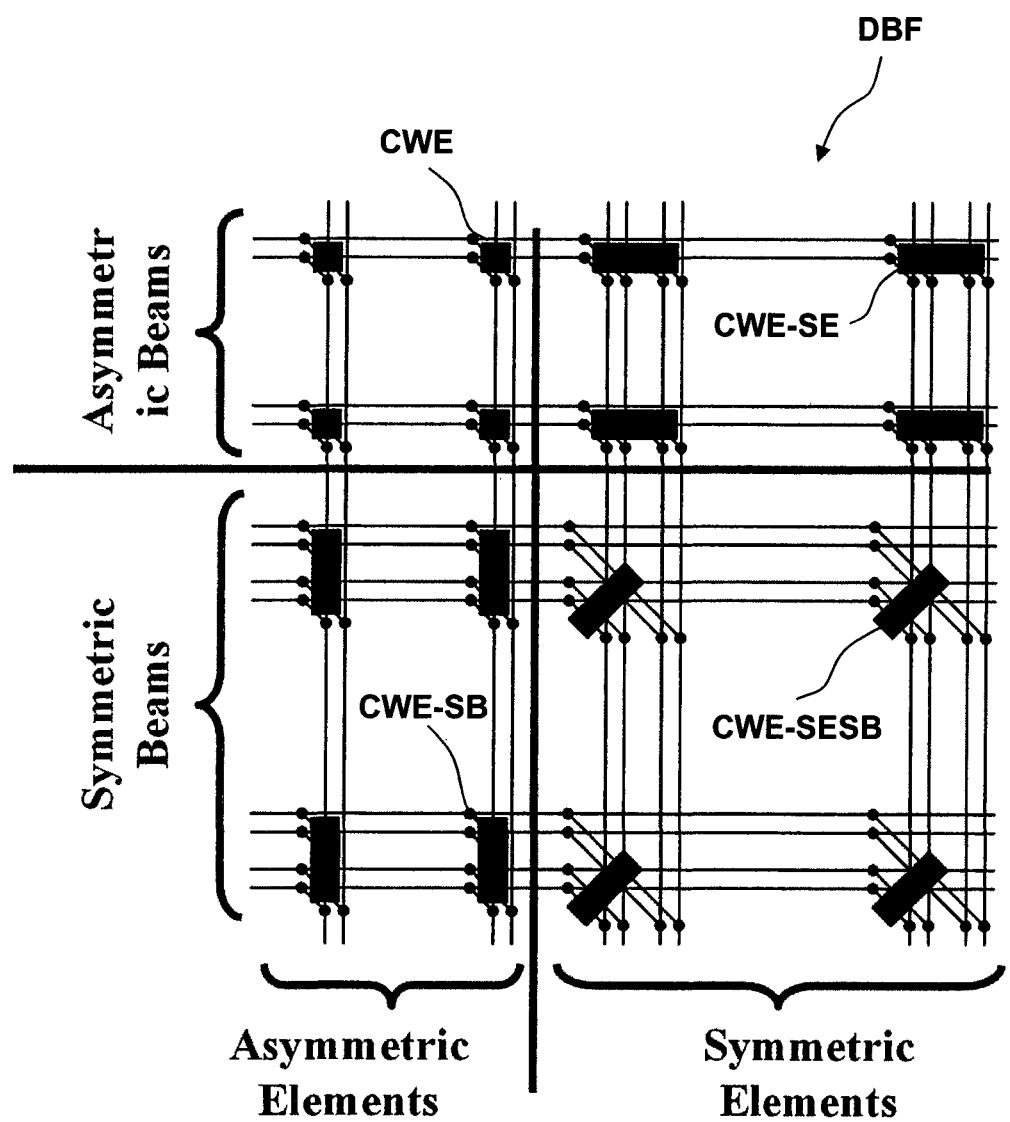
Figure 19:
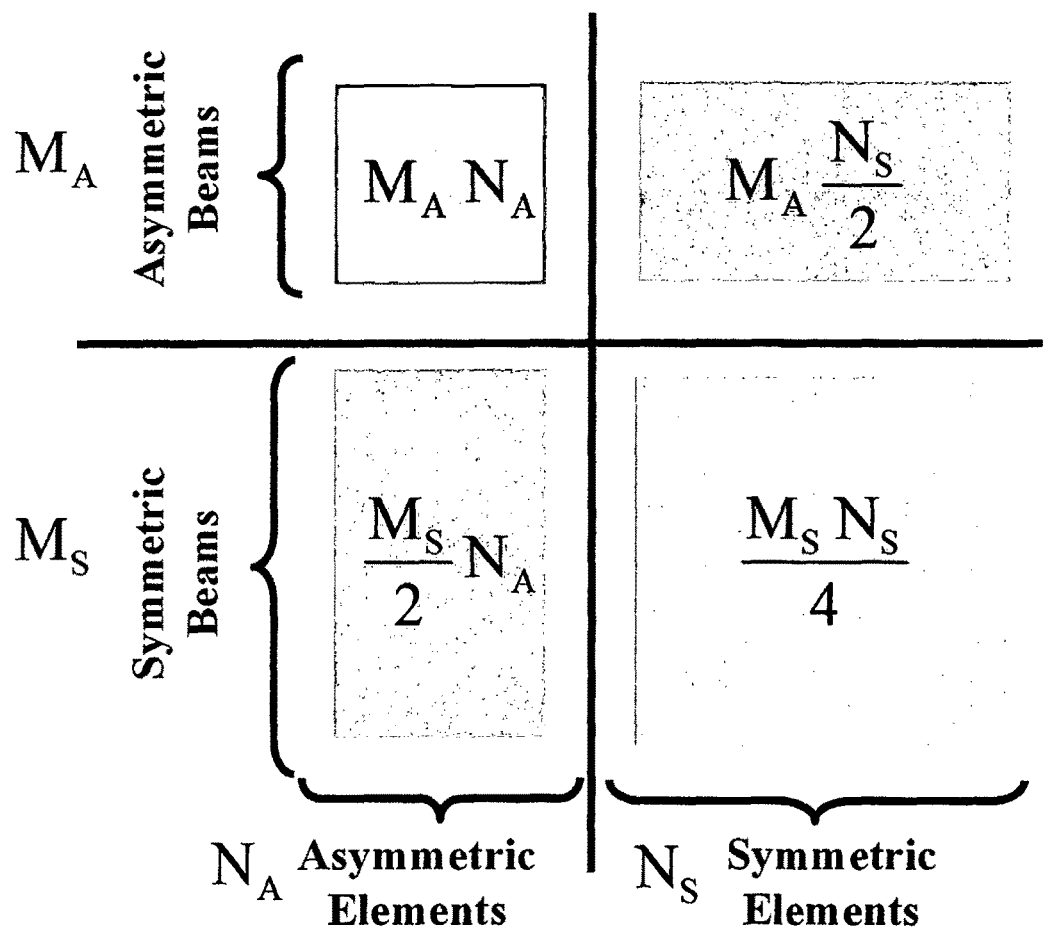

FIGS. 3A-H show different examples of planar array geometries to which the present invention can be applied;

FIG. 4 represents the functional block diagram of a digital BFN according to the prior-art, showing maximal degrees of freedoms but highest complexity;

FIG. 5 represents the flow diagram of a generic complex weighting elements used in the BFN of FIG. 4;

FIG. 6 illustrates the geometry associated to two axis-symmetric antenna elements pointing in a given direction;

FIG. 7 represents a projection of the geometry of FIG. 6 along the plane including the axis of symmetry and the pointing vector;

FIG. 8 represents the functional block diagram of the digital BFN according to a first embodiment of the invention, exploiting only the axial symmetry of all or some array elements;

FIG. 9 represents the flow diagram of a generic complex weighting elements used in the BFN of FIG. 8;

FIG. 10 illustrates the geometry associated to a single array element pointing at two axis-symmetric directions;

FIG. 11 represents a projection of the geometry of FIG. 10 along the plane including the axis of symmetry and the pointing vectors;

FIG. 12 represents the functional block diagram of the digital BFN according to a second embodiment of the invention, exploiting only beam pointing symmetry;

FIG. 13 represents the flow diagram of a generic complex weighting elements used in the BFN of FIG. 12;

FIG. 14 illustrates the geometry associated to two axis-symmetric antenna elements pointing at two axis-symmetric directions;

FIG. 15 represents a projection of the geometry of FIG. 14 along the plane including the axis of symmetry and the pointing vectors;

FIG. 16 represents the functional block diagram of the digital BFN according to a third embodiment of the invention, exploiting both element symmetry and beam pointing symmetry;

FIG. 17 represents the flow diagram of a generic complex weighting elements used in the BFN of FIG. 16;

FIG. 18 represents the functional block diagram of the digital BFN according to a forth embodiment of the invention, exploiting a mix of all possible combinations of elements' symmetry and beam pointing symmetry;

FIG. 19 shows the multiplications breakdown for the digital BFN according to the embodiment of FIG. 18.

An array antenna AA is composed of a set of N radiating elements RE placed in the positions $r_n$ and excited by complex weights $w(n)$. The array factor $AF(u,v)$ can be evaluated by mean of a Fourier transform of the array discrete field $p(r)$, $$p(r) = \sum_{n=1}^{N} w(n)\delta(r - r_n) \qquad (1)$$

$$AF(u,v) = \sum_{n=1}^{N} w(n)\exp(jk_0 \hat{k} \cdot r_n) \qquad (2)$$

where, $\delta(r)$ is the Dirac delta function and, in the case of a planar array (radiating elements disposed in the x-y plane):

$$r = \hat{x}x + \hat{y}y \qquad (3)$$

$$r_n = \hat{x}x_n + \hat{y}y_n \qquad (4)$$

$$k_0 = \frac{2\pi}{\lambda} \qquad (5)$$

$$\hat{k} = \hat{x}u + \hat{y}v + \hat{z}w \qquad (6)$$
$$= \hat{x}\sin\vartheta\cos\varphi + \hat{y}\sin\vartheta\sin\varphi + \hat{z}\cos\vartheta$$
$$= = \hat{x}u + \hat{y}v + \hat{z}\sqrt{1 - u^2 - v^2}$$

Considering that the array is planar and that the antenna elements lie in the x-y plane, it is sufficient to consider for the scalar product $\hat{k} \cdot r_n$ in (2) the projection $k_\perp$ of the steering vector $\hat{k}$ on the x-y plane.

$$k_\perp = \hat{x}\sin\vartheta\cos\varphi + \hat{y}\sin\vartheta\sin\varphi \qquad (7)$$
$$= \hat{x}u + \hat{y}v$$

The indexes of the $N_S$ radiating elements fulfilling a symmetry condition can be re-numbered and grouped in ordered couples (n,−n) such that a spatial transformation T(.) of the element $r_n$ would result in the element $r_{-n}$:

$$T(r_n) = r_{-n} \qquad (8)$$

Figure 1:
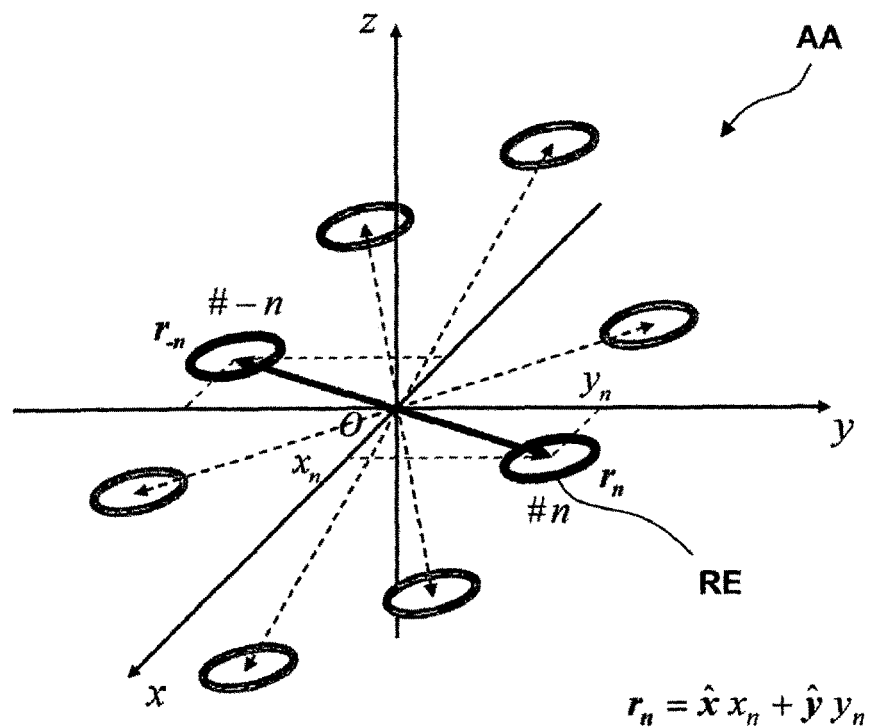
FIG. 1 illustrates the general geometry of a planar array antenna.

In particular, the array of FIG. 1 is axis-symmetric, with a symmetry axis coinciding with the z Cartesian axis. It is worth noting that the class of planar arrays with axis-symmetric radiating elements is quite vast and include a large number of array geometries. Specific examples are reported in FIG. 3A to FIG. 3H, where dots represents radiating elements.

With the introduced renumbering and considering the projection $k_\perp$ of steering vector $\hat{k}$ on the x-y plane, equation (2) can be rearranged as, $$AF(u,v) = \sum_{n=1}^{\frac{N_S}{2}} [w(n)\exp(jk_0 k_\perp \cdot r_n) + w(-n)\exp(jk_0 k_\perp \cdot r_{-n})] \qquad (9)$$

The coordinates system, the array topology and the radiation pattern coordinates system are briefly described in FIG. 1, FIG. 2, and FIG. 3A to FIG. 3H, respectively.

One of the most advantageous features of array antennas is the simplicity of performing beam scanning. Defining a prototypal beam with an excitation set $w_0(n)$ and an array factor, $$AF_0(u,v) = \sum_{n=1}^{\frac{N_S}{2}} [w_0(n)\exp(jk_0 k_\perp \cdot r_n) + w_0(-n)\exp(jk_0 k_\perp \cdot r_{-n})] \qquad (10)$$

pointed to the broadside direction $k_{\perp 0} \equiv (u_0, v_0) = (0,0)$, to scan the beam AB to the direction $k_\perp \equiv (u,v)$ (see FIG. 2), the new set of excitations, $w(n,k_\perp)$, can be derived from the preceding as, $$w(n, k_\perp) = w_0(n) \cdot \exp(-jk_0 k_\perp \cdot r_n) \qquad (11)$$
$$= w_0(n) \cdot s(r_n, k_\perp)$$

where the steering factor $s(r_n,k_\perp)$ represents the phase correction required to align the array phase-front with respect to the pointing direction, as defined by the following equation:

$$s(r_n,k_\perp) = \exp(-jk_0 k_\perp \cdot r_n) \qquad (12)$$

Figure 2:
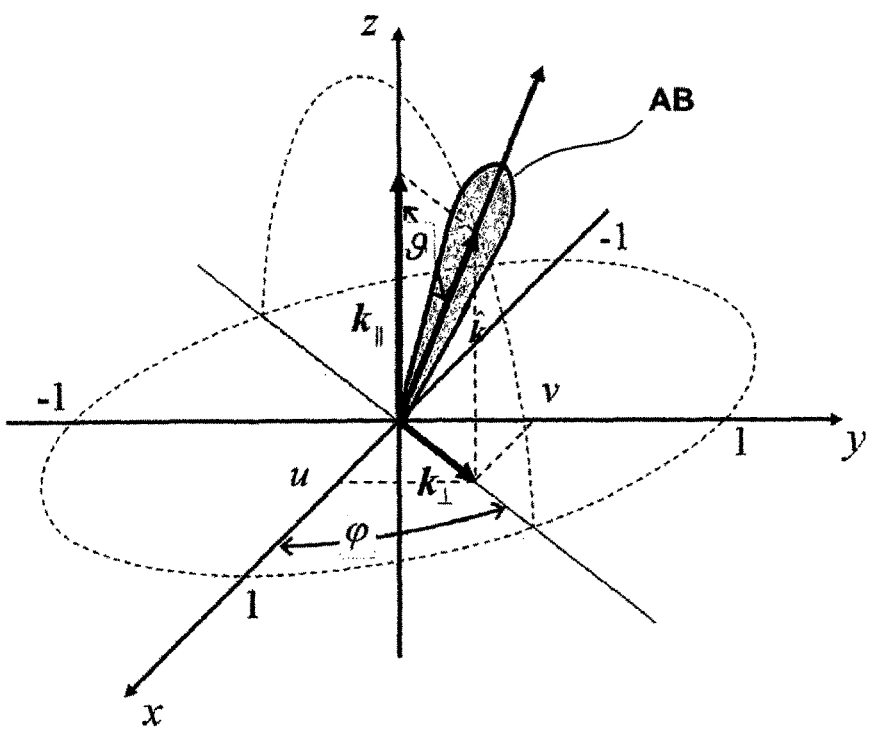
FIG. 2 illustrates the pointing direction of a beam generated by a planar array antenna.
Figure 3A:
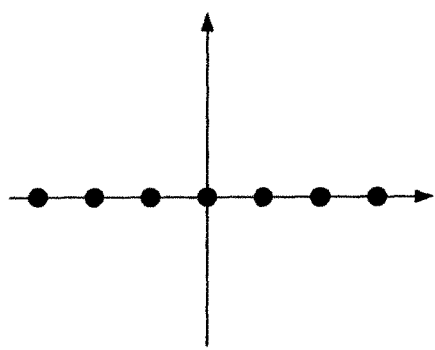
Figure 3B:
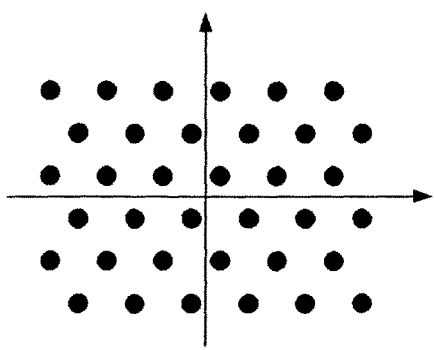
Figure 3C:
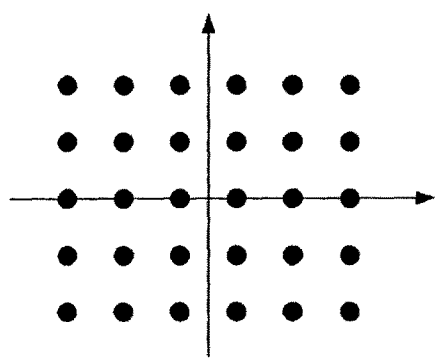
Figure 3D:
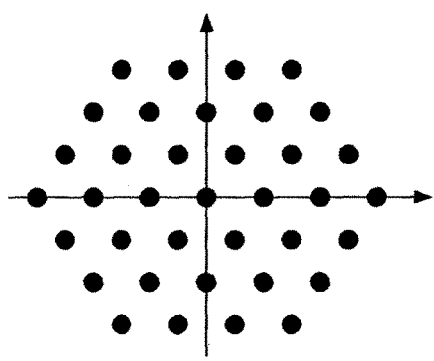
Figure 3E:
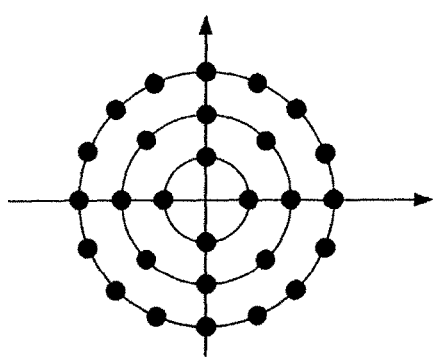
Figure 3F:
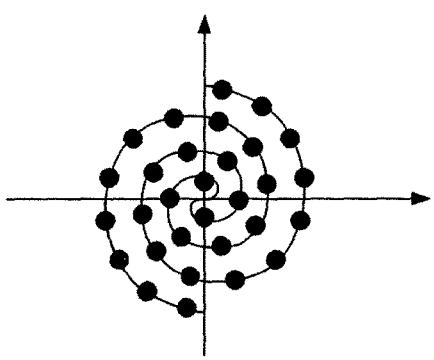
Figure 3G:
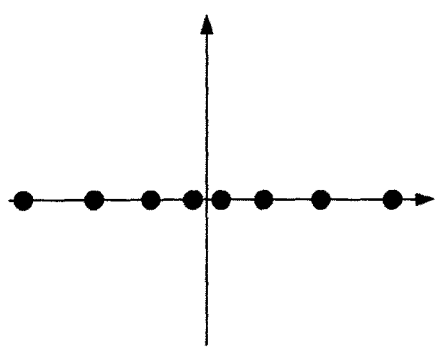
Figure 3H:
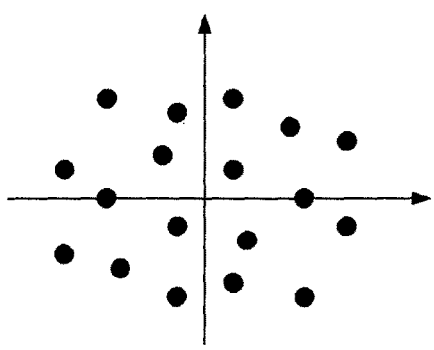

As shown on FIG. 2, u and v define the direction of the unity steering vector $\hat{k}$, i.e. they carry information equivalent to the angles $\vartheta$ and $\varphi$ formed by the beam pointing direction and the z axis and the x axis, respectively.

Equation (11) shows the possibility of separating excitation tapering for beam shape and sidelobes control from phase steering for beam pointing.

From Equation (12) it is possible to derive the steering factor necessary for an axis-symmetric element, $$r_{-n} = -r_n \qquad (13)$$

$$s(r_{-n},k_\perp) = \exp(-jk_0 k_\perp \cdot r_{-n}) = \exp(jk_0 k_\perp \cdot r_n) \qquad (14)$$

which can be summarised as, $$s(r_{-n},k_\perp) = s^*(r_n,k_\perp) \qquad (15)$$

where "*" represents complex conjugation.

Relationship (15) can be better understood by means of FIG. 6 and FIG. 7 where it is pictorially shown how centre-symmetric elements require for the steering factor, an identical electrical length but opposite signs.

Similarly it can be appreciated that to generate a beam pointing in the opposite centre-symmetric direction $-k_\perp$, the steering factor of the n-th elements would need a conjugate steering factor, such that the following hold true:

$$s(r_n,-k_\perp) = s^*(r_n,k_\perp) \qquad (16)$$

This relationship can be better understood examining FIG. 10 and FIG. 11 where it is pictorially shown how the centre-symmetric steering direction $-k_\perp$ would require an electrical length equivalent to the one relevant to the steering vector $k_\perp$ but with an opposite sign.

Lastly, it can also be demonstrated that to generate a beam pointing in the opposite centre-symmetric direction $-k_\perp$, the steering factor for the $-n$-th axis-symmetric element (i.e. the element axially-symmetric with respect to the n-th element) would need a conjugate steering factor:

$$s(r_{-n},-k_\perp) = s(r_n,k_\perp) \qquad (17)$$

The above identities (15), (16), and (17), follow from Eq. (12).

Complex baseband signals can be represented in digital form as follows. The time (sampled) complex input signal of the m-th beam, $a_m(t)$, is represented by its real (or "in-phase") and imaginary (or "quadrature") parts, $A_m^I$ and $A_m^Q$, respectively, $$a_m(t) = \text{Re}[a_m(t)] + j\text{Im}[a_m(t)] \qquad (18)$$
$$= A_m^I + jA_m^Q$$

Similarly, the time (sampled) complex output signal for the n—the antenna element, $b_n(t)$, is represented by means of its real (or "in-phase") and imaginary (or "quadrature") parts, $B_n^I$ and $B_n^Q$, respectively, $$b_n(t) = \text{Re}[b_n(t)] + j\text{Im}[b_n(t)] \qquad (19)$$
$$= B_n^I + jB_n^Q$$

The complex beam-forming coefficient $E_{n,m}$, decomposed in its real and imaginary parts, $E_{n,m}^I$ and $E_{n,m}^Q$, respectively, will represent the complex multiplicative factor to apply to the m-th beam to obtain the n-th antenna element signal, $$E_{n,m} = \text{Re}[E_{n,m}] + j\text{Im}[E_{n,m}] \qquad (20)$$
$$= E_{n,m}^I + jE_{n,m}^Q$$

The arithmetical operation of the digital beamforming matrix is then described by the general expression, $$B_n^I + jB_n^Q = \sum_m (E_{n,m}^I + jE_{n,m}^Q)(A_m^I + jA_m^Q) \qquad (21)$$
$$= \sum_m [(E_{n,m}^I A_m^I - E_{n,m}^Q A_m^Q) + j(E_{n,m}^Q A_m^I + E_{n,m}^I A_m^Q)]$$

or, equivalently, in matrix form, $$\begin{bmatrix} B_n^I \\ B_n^Q \end{bmatrix} = \sum_m \begin{bmatrix} E_{n,m}^I & -E_{n,m}^Q \\ E_{n,m}^Q & E_{n,m}^I \end{bmatrix} \begin{bmatrix} A_m^I \\ A_m^Q \end{bmatrix} \qquad (22)$$

Equation (22) offers an interpretation of the basic arithmetic operations (i.e., multiplications and additions) that must be performed by complex weighting elements (WE) forming a digital BFN. In particular, the complex multiplication by $E_{n,m}$ is equivalent to four real multiplications and two additions. The flow diagram of a generic complex weighting element WE as used in a digital BFN known in prior-art is shown in FIG. 5. The complex weighting element (CWE) has:

an input port comprising an in-phase and a quadrature channel, for the real and imaginary parts $A_m^I$, $A_m^Q$ of a beam signal;

an output port comprising an in-phase and a quadrature channel, for two contributions to the real and imaginary parts of an antenna element, respectively;

four real weighting elements $RWE_1$-$RWE_4$, implementing real multiplications;

an input network linking the input port to the real weighting elements; and an output network linking the real weighting elements to the output port.

The in-phase channel of the input port is connected to both the first and second real weighting elements, which have weights $E_{n,m}^I$ and $E_{n,m}^Q$, through a signal splitter SP of the input network. Similarly, the quadrature channel of the input port is connected to both the third and fourth real weighting elements, which have weights $E_{n,m}^Q$ and $E_{n,m}^I$, respectively, through another signal splitter SP of the input network.

On the output side, the outputs of the first and third real weighting elements are combined through a summing node SN and a sign changing element SCE to feed the in-phase channel of the output port, and the outputs of the second and fourth real weighting elements are combined through another summing node SN to feed the quadrature channel of the output port.

The functional block diagram of a fully populated digital BFN is reported in FIG. 4 showing maximal degrees of freedoms but highest complexity. This BFN has a set EP of N antenna ports (output ports) and a set BP of M beam ports (input ports), each comprising an in-phase channel and a quadrature channel, and comprises N·M complex weighting elements of the kind illustrated on FIG. 5 and discussed above. The signals entering the BFN through each beam port are distributed to N complex weighting elements CWE by signal splitters SP. Each antenna port outputs an excitation signal obtained by adding the output signals of M complex weighting elements using summing nodes SN.

Considering that the steering factor necessary for an axis-symmetric element satisfies the conjugate relationship (15), the expression for complex digital signal of the −n-th antenna element can be written as, $$B_{-n}^I + jB_{-n}^Q = \sum_m (E_{-n,m}^I + jE_{-n,m}^Q)(A_m^I + jA_m^Q) \quad (23)$$

$$= \sum_m (E_{n,m}^I - jE_{n,m}^Q)(A_m^I + jA_m^Q)$$

$$= \sum_m [(E_{n,m}^I A_m^I + E_{n,m}^Q A_m^Q) + j(-E_{n,m}^Q A_m^I + E_{n,m}^I A_m^Q)]$$

Grouping together axis-symmetric elements, the equivalent matrix expression can be obtained:

$$\begin{bmatrix} B_n^I \\ B_n^Q \\ B_{-n}^I \\ B_{-n}^Q \end{bmatrix} = \sum_m \begin{bmatrix} E_{n,m}^I & -E_{n,m}^Q \\ E_{n,m}^Q & E_{n,m}^I \\ E_{n,m}^I & E_{n,m}^Q \\ -E_{n,m}^Q & E_{n,m}^I \end{bmatrix} \begin{bmatrix} A_m^I \\ A_m^Q \end{bmatrix} \quad (24)$$

Equation (24) shows that some multiplications are repeated and can be performed only once. This observation leads to the introduction of a complex weighting element for symmetric elements (CWE-SE) as shown in the flow diagram of FIG. 9. The arithmetical complexity of a CWE-SE (functionally equivalent to two CWEs of the kind illustrated by FIG. 5) is limited to four multiplications, two sign changes and four additions. The first embodiment of the invention exploits this complexity reduction and the relevant DBF block diagram is shown in FIG. 8.

As shown in FIG. 9 illustrating the flow diagram of a generic complex weighting element for symmetric elements (CWE-SE), the complex weighting element for symmetric elements (CWE-SE) has:
- an input port comprising an in-phase and a quadrature channel for the real and imaginary parts $A_m^I$, $A_m^Q$ of a single beam signal;
- a first output port comprising a first in-phase and a first quadrature channel for two contributions to the real and imaginary parts $B_n^I$, $B_n^Q$ of a first antenna element n respectively,
- a second output port comprising a second in-phase and a second quadrature channel for two contributions to the real and imaginary parts $B_{-n}^I$, $B_{-n}^Q$ of a second antenna element −n respectively, the first antenna element n and the second antenna element −n being arranged symmetrically to a symmetry axis,
- four real weighting elements $RWE_1$, $RWE_2$, $RWE_3$, $RWE_4$, implementing real multiplications;
- an input network linking the input port to the real weighting elements; and
- an output network linking the real weighting elements to the first and second output ports.

The first real weighting element interconnects the in-phase channels of both first and second antenna elements ports with the in-phase channel of the beam port.

The second real weighting element interconnects the quadrature channels of both first and second antenna elements ports with the in-phase channel of the beam port.

The third real weighting element interconnects the in-phase channels of both first and second antenna ports with the quadrature channel of the beam port.

The fourth real weighting element interconnects the quadrature channels of both first and second antenna elements ports with the quadrature channel of the beam port.

As a particular configuration shown in the FIG. 9, the first and fourth real weighting elements, and the second and third real weighting elements have identical real weight. Moreover sign-changing elements (SCE) are provided on the signal paths connecting the second real weighting element with the quadrature channel of the second antenna port and the third real weighting element with the in-phase channel of the first antenna element port.

The first embodiment as described in FIG. 8 can be generalized by considering a digital beam-forming network that comprises at least one complex weighting element as illustrated in FIG. 9 interconnecting a first and second antenna ports, to be associated to respective antenna elements which are arranged symmetrically with respect to a symmetry axis, with a single beam port.

Considering now the steering factor necessary for the same array element pointing at two axis-symmetric directions and the relationship (16), the expression for the complex digital signal of the −n-th antenna element can be written as, $$B_n^I + jB_n^Q = \sum_{m=-M_s/2}^{M_s/2} (E_{n,m}^I + jE_{n,m}^Q)(A_m^I + jA_m^Q) \quad (25)$$

$$= \sum_{m=1}^{M_s/2} [(E_{n,m}^I + jE_{n,m}^Q)(A_m^I + jA_m^Q) +$$

$$(E_{n,-m}^I + jE_{n,-m}^Q)(A_{-m}^I + jA_{-m}^Q)]$$

$$= \sum_{m=1}^{M_s/2} [(E_{n,m}^I + jE_{n,m}^Q)(A_m^I + jA_m^Q) +$$

$$(E_{n,m}^I - jE_{n,m}^Q)(A_{-m}^I + jA_{-m}^Q)]$$

$$= \sum_{m=1}^{M_s/2} \{E_{n,m}^I(A_m^I + A_{-m}^I) + E_{n,m}^Q(-A_m^Q + A_{-m}^Q) +$$

$$j[E_{n,m}^I(A_m^Q + A_{-m}^Q) + E_{n,m}^Q(A_m^I - A_{-m}^I)]\}$$

Grouping together axis-symmetric beam signals, the equivalent matrix expression is obtained $$\begin{bmatrix} B_n^I \\ B_n^Q \end{bmatrix} = \sum_{m=1}^{M_s/2} \begin{bmatrix} E_{n,m}^I & -E_{n,m}^Q & E_{n,m}^I & E_{n,m}^Q \\ E_{n,m}^Q & E_{n,m}^I & -E_{n,m}^Q & E_{n,m}^I \end{bmatrix} \begin{bmatrix} A_m^I \\ A_m^Q \\ A_{-m}^I \\ A_{-m}^Q \end{bmatrix} \quad (26)$$

Equation (26) shows that some multiplications are repeated and can be performed only once. This observation leads to the introduction of a complex weighting element for symmetric beams (CWE-SB) as shown in the flow diagram of FIG. 13; it can be seen that summing nodes and sign-changing elements are present in both the input and output networks. The arithmetical complexity of a CWE-SB (functionally equivalent to two CWEs of the kind illustrated by FIG. 5) is limited to four multiplications, three sign changes and six additions. The second embodiment of the invention exploits this complexity reduction and the relevant DBF block diagram is shown in FIG. 12.

As shown in FIG. 13 illustrating the flow diagram of a generic complex weighting element for symmetric beams (CWE-SB) according to the second embodiment of the invention, the complex weighting element for symmetric beams (CWE-SB) has:
- a first input port comprising an in-phase and a quadrature channel for the real and imaginary parts $A_m^I$, $A_m^Q$ of a first antenna beam m signal;
- a second input port comprising an in-phase and a quadrature channel for the real and imaginary parts $A_{-m}^I$, $A_{-m}^Q$ of a second antenna beam −m signal, the first antenna beam m and the second antenna beam −m pointing toward directions which are symmetrical with respect to a symmetry axis;
- an output port comprising a first in-phase and a first quadrature channel for two contributions to the real and imaginary parts $B_n^I$, $B_n^Q$ of a single antenna element n respectively;
- four real weighting elements $RWE_1$, $RWE_2$, $RWE_3$, $RWE_4$, implementing real multiplications;
- an input network linking the first and second input ports to the real weighting elements; and
- an output network linking the real weighting elements to the output port.

The first real weighting element $RWE_1$ interconnects the in-phase channel of the antenna element n port to the in-phase channels of both the first beam m port and the second beam −m port.

The second real weighting element $RWE_2$ interconnects the quadrature channel of the antenna element n port to the in-phase channels of both the first beam m port and the second beam −m port.

The third real weighting element $RWE_3$ interconnects the in-phase channel of the antenna element n port to the quadrature channels of both the first beam m port and the second beam −m port.

The fourth real weighting element $RWE_4$ interconnects the quadrature channel of the antenna element port to the quadrature channels of both the first beam m port and the second beam −m port.

As a particular configuration shown in the FIG. 13, the first and fourth real weighting elements, and the second and third real weighting elements, can have identical real weight. Moreover sign-changing elements (SCE) are provided on the signal paths connecting the second real weighting element with the in-phase channel of the second beam −m port, the third real weighting element with the quadrature channel of the second beam −m port, and the third real weighting element with the in-phase channel of the antenna n port.

The second embodiment of the invention as shown in FIG. 12 can be generalized by considering a digital beam-forming network that comprise at least one complex weighting element as illustrated in FIG. 13 interconnecting a single antenna port with a first and a second beam ports, corresponding to respective antenna beams pointing toward directions which are symmetrical with respect to a symmetry axis.

Finally, considering the steering factors necessary for two axis-symmetric antenna elements contemporarily pointing at two axis-symmetric directions and making use of relationships (15), (16), and (17), the expression for the complex digital signal of the −n-th antenna element can be written as, $$B_{-n}^I + jB_{-n}^Q = \sum_{m=-M_s/2}^{M_s/2} (E_{-n,m}^I + jE_{-n,m}^Q)(A_m^I + jA_m^Q) \quad (27)$$

$$= \sum_{m=1}^{M_s/2} [(E_{-n,m}^I + jE_{-n,m}^Q)(A_m^I + jA_m^Q) +$$

$$(E_{-n,-m}^I + jE_{-n,-m}^Q)(A_{-m}^I + jA_{-m}^Q)]$$

$$= \sum_{m=1}^{M_s/2} [(E_{n,m}^I - jE_{n,m}^Q)(A_m^I + jA_m^Q) +$$

$$(E_{n,m}^I - jE_{n,m}^Q)(A_{-m}^I + jA_{-m}^Q)]$$

$$= \sum_{m=1}^{M_s/2} \{E_{n,m}^I(A_m^I + A_{-m}^I) + E_{n,m}^Q(-A_m^Q + A_{-m}^Q) +$$

$$j[E_{n,m}^I(A_m^Q + A_{-m}^Q) + E_{n,m}^Q(-A_m^I + A_{-m}^I)]\}$$

and in matrix form, $$\begin{bmatrix} B_n^I \\ B_n^Q \\ B_{-n}^I \\ B_{-n}^Q \end{bmatrix} = \sum_{m=1}^{M_s/2} \begin{bmatrix} E_{n,m}^I & -E_{n,m}^Q & E_{n,m}^I & E_{n,m}^Q \\ E_{n,m}^Q & E_{n,m}^I & -E_{n,m}^Q & E_{n,m}^I \\ E_{n,m}^I & E_{n,m}^Q & E_{n,m}^I & -E_{n,m}^Q \\ -E_{n,m}^Q & E_{n,m}^I & E_{n,m}^Q & E_{n,m}^I \end{bmatrix} \begin{bmatrix} A_m^I \\ A_m^Q \\ A_{-m}^I \\ A_{-m}^Q \end{bmatrix} \quad (28)$$

The inner matrix can be factorised as follows, $$\begin{bmatrix} E_{n,m}^I & -E_{n,m}^Q & E_{n,m}^I & E_{n,m}^Q \\ E_{n,m}^Q & E_{n,m}^I & -E_{n,m}^Q & E_{n,m}^I \\ E_{n,m}^I & E_{n,m}^Q & E_{n,m}^I & -E_{n,m}^Q \\ -E_{n,m}^Q & E_{n,m}^I & E_{n,m}^Q & E_{n,m}^I \end{bmatrix} = \begin{bmatrix} 1 & 0 & -1 & 0 \\ 0 & 1 & 0 & 1 \\ 1 & 0 & 1 & 0 \\ 0 & -1 & 0 & -1 \end{bmatrix} \cdot \quad (29)$$

$$\begin{bmatrix} E_{n,m}^I & 0 & 0 & 0 \\ 0 & E_{n,m}^Q & 0 & 0 \\ 0 & 0 & E_{n,m}^Q & 0 \\ 0 & 0 & 0 & E_{n,m}^I \end{bmatrix} \cdot \begin{bmatrix} 1 & 0 & 1 & 0 \\ 1 & 0 & -1 & 0 \\ 0 & 1 & 0 & -1 \\ 0 & 1 & 0 & 1 \end{bmatrix}$$

and Equation (28) can be rewritten as, $$\begin{bmatrix} B_n^I \\ B_n^Q \\ B_{-n}^I \\ B_{-n}^Q \end{bmatrix} = \begin{bmatrix} 1 & 0 & -1 & 0 \\ 0 & 1 & 0 & 1 \\ 1 & 0 & 1 & 0 \\ 0 & -1 & 0 & -1 \end{bmatrix} \cdot \qquad (30)$$

$$\sum_{m=1}^{M} \begin{bmatrix} E_{n,m}^I & 0 & 0 & 0 \\ 0 & E_{n,m}^Q & 0 & 0 \\ 0 & 0 & E_{n,m}^Q & 0 \\ 0 & 0 & 0 & E_{n,m}^I \end{bmatrix} \cdot \begin{bmatrix} 1 & 0 & 1 & 0 \\ 1 & 0 & -1 & 0 \\ 0 & 1 & 0 & -1 \\ 0 & 1 & 0 & 1 \end{bmatrix} \begin{bmatrix} A_m^I \\ A_m^Q \\ A_{-m}^I \\ A_{-m}^Q \end{bmatrix}$$

Also in this case, it is clear from (26) that some multiplications are repeated and can be performed only once. This observation leads to the introduction of a complex weighting element for symmetric elements/symmetric beams (CWE-SESB) as shown in the flow diagram of FIG. 17. The arithmetical complexity of a WE-SESB (functionally equivalent to four WEs) is limited to only four multiplications, four sign changes and eight additions. The third embodiment of the invention exploits this complexity reduction and the relevant DBF block diagram is shown in FIG. 16.

As shown in FIG. 17 illustrating the flow diagram of a generic complex weighting element for symmetric elements/symmetric beams (CWE-SESB) according to the third embodiment of the invention, the complex weighting element for symmetric elements/symmetric beams (CWE-SESB):
 a first input port comprising an in-phase and a quadrature channel for the real and imaginary parts $A_m^I$, $A_m^Q$ of a first antenna beam m signal;
 a second input port comprising an in-phase and a quadrature channel for the real and imaginary parts $A_{-m}^I$, $A_{-m}^Q$ of a second antenna beam -m signal, the first antenna beam m and the second antenna beam -m pointing toward directions which are symmetrical with respect to a symmetry axis;
 a first output port comprising a first in-phase and a first quadrature channel for two contributions to the real and imaginary parts $B_n^I$, $B_n^Q$ of a first antenna element n respectively,
 a second output port comprising a second in-phase and a second quadrature channel for two contributions to the real and imaginary parts $B_{-n}^Q$, $B_{-n}^Q$ of a second antenna element -n respectively, the first antenna element n and the second antenna element -n being arranged symmetrically to a symmetry axis,
 four real weighting elements $RWE_1$, $RWE_2$, $RWE_3$, $RWE_4$, implementing real multiplications;
 an input network linking the first and second input ports to the real weighting elements; and
 an output network linking the real weighting elements to the first and second output ports.

The first real weighting element $RWE_1$ interconnects the in-phase channels of both the first antenna element n port and the second antenna element -n port with the in-phase channels of both the first beam port m and the second beam -m port.

The second real weighting element $RWE_2$ interconnects the quadrature channels of both the first antenna element n port and the second antenna element -n port with the in-phase channels of both the first beam m port and the second beam -m port.

The third real weighting element $RWE_3$ interconnects the in-phase channels of both the first antenna element n port and the second antenna element -n port with the quadrature channels of both the first beam m port and the second beam -m port.

The fourth real weighting element $RWE_4$ interconnects the quadrature channels of both the first antenna element n port and the second antenna element -n port with the quadrature channels of both the first beam m port and the second beam -m port.

As a particular configuration shown in FIG. 17, the first and fourth real weighting elements, and the second and third real weighting elements, can have identical real weight. Moreover sign-changing elements (SCE) are provided on the signal paths connecting the second real weighting element with the quadrature channel of said second antenna port, the second real weighting element with the in-phase channel of the second beam port, the third real weighting element with the in-phase channel of said first antenna port and the third real weighting element with the quadrature channel of said second beam port.

The third embodiment of the invention as shown in FIG. 16 can be generalized by considering a digital beam-forming network that comprises at least one complex weighting element for symmetric elements/symmetric beams (CWE-SESB) as illustrated in FIG. 17 interconnecting a first and second antenna ports, to be associated to respective antenna elements which are arranged symmetrically with respect to a symmetry axis, with a first and a second beam ports, corresponding to respective antenna beams pointing toward directions which are symmetrical with respect to a symmetry axis, In summary the following symmetries lead to a complexity reduction:
 Element positions axial-symmetry;
 Beam steering direction axial-symmetry;
 Combination of element positions axial-symmetry and beam steering direction axial-symmetry.

Furthermore, considering that real multiplications can be assumed to be the most area/power consuming DSP arithmetic blocks, and taking as reference unit the four real multiplication required for a complex weighting element CWE of an asymmetric-beams/asymmetric-element, the overall complexity saving can be quantified in:
 50% for the first embodiment (i.e. element positions axial-symmetry);
 50% for the second embodiment (i.e., beam steering direction axial-symmetry);
 75% for the third embodiment (i.e. combination of element positions axial-symmetry and beam steering direction axial-symmetry).

The most general condition can be thought to consist in combination of the possible symmetries and non/symmetries, i.e.:
 Asymmetric-Beams/Asymmetric-Elements;
 Asymmetric-Beams/Symmetric-Elements;
 Symmetric-Beams/Asymmetric-Elements;
 Symmetric-Beams/Symmetric-Elements;

Indicating with $N_A$ and $N_S$ the number of asymmetric and axial-symmetric antenna elements, respectively, and with $M_A$ and $M_S$ the number of asymmetric and axial-symmetric beam steering directions, respectively, it is possible to introduce a fourth and more general embodiment of the invention that allow to exploit to the maximal extent all the symmetries. The relevant block diagram of the digital BFN is reported in FIG. 18.

The complexity evaluation of the digital BFN exploiting the mix of all possible combinations of element symmetry and beam pointing symmetry according to the forth embodiment of the invention is summarised in FIG. 18 (in terms of real multiplication of an equivalent complex weighting element CWE).

The invention has been described with reference to the case of a transmit antenna. Generalization to the case of a receive antenna is straightforward: signal splitters have to be replaced by summing nodes and vice-versa, and inputs and outputs of the real weighting elements have to be swapped. In the case of a receive antenna, the "antenna beam" corresponds to the main receiving lobe.

The digital BFN of the invention can be implemented in hardware, e.g. in the form of an Application Specific Integrated Circuit (ASIC), using adders and multipliers built using logical gates. It can also be implemented in software, in the form of a program run by a Digital Signal Processor (DSP), or in a hybrid hardware-software form.

The array antenna can be planar or not.

The digital BFN architecture described above offers several advantages over the prior art, a non exhaustive list of which includes:
- Use of an unique architecture for supporting several array geometries.
- Scalable design, able to support from few to hundreds/thousand beams and elements.
- A high degree of modularity, provided by the decomposition of the BFN in building blocks. Therefore, larger architectures can be obtained replicating the basic building blocks. Moreover, different functionalities can be obtained differently combining the basic building blocks.
- High efficiency in terms of technology and reduced complexity (the reduced complexity advantage should be understood in terms of reduction of the number of devices, mass, area/volume, power consumption, power dissipation, integration and testing time and cost).

REFERENCES

[1] C. Mangenot, G. Toso, P. Angeletti, "Active Arrays for Satellite Applications: the Quest for increased Power Efficiency", in I. E Lager, M. Simeoni, (Editors), Antennas for Ubiquitous Radio Services in a Wireless Information Society, IOS Press, 2010
[2] P. Angeletti, M. Lisi, "Beam-Forming Network Developments for European Satellite Antennas", (Special Report), Microwave Journal, Vol. 50, No. 8, August 2007
[3] A. M. Bishop et al, "The Inmarsat 4 Digital Processor and Next Generation Developments", AIAA International Communication Satellite Systems Conference (ICSSC), Roma, Italy, 2005
[4] J. L. Butler, *Multiple beam antenna system employing multiple directional couplers in the leadin*, U.S. Pat. No. 3,255,450, June 1960
[5] C. Topping, A. M. Bishop, A. D. Craig, D. M. Howe, J. Hamer, P. Angeletti, A. Senior, "S-UMTS Processor Key Technolgies Demonstrator", Proceedings of the 10th International Workshop on Signal Processing for Space, Rhodes Island, Greece, 6-8 Oct. 2008
[6] T. Teshirogi, *Beam forming network for multibeam array antenna*, U.S. Pat. No. 4,584,581, April 1986

The invention claimed is:

1. A digital beam-forming network (DBF) for an array antenna having N>1 antenna ports, to be associated with respective antenna elements, and M≥1 beam ports, corresponding to respective antenna beams, the digital beam-forming network comprising:
a plurality of complex weighting elements interconnected through summing nodes; wherein at least one of the complex weighting elements is connected to either two antenna ports, to be associated with respective antenna elements which are arranged symmetrically with respect to a symmetry axis to provide first symmetries, or two beam ports corresponding to respective antenna beams pointing toward directions which are symmetrical with respect to a symmetry axis to provide second symmetries, or both;
the digital beam-forming network being configured to exploit said first or second symmetries, or configured to exploit first and second symmetries.

2. A digital beam-forming network according to claim 1, wherein each antenna port and each beam port comprises an in-phase and a quadrature channel, and wherein each complex weighting element comprises four real weighting elements.

3. A digital beam-forming network according to claim 2, having at least one complex weighting element of the plurality of complex weighting elements interconnecting a first and second antenna ports, to be associated with respective antenna elements which are arranged symmetrically with respect to the symmetry axis, with a single beam port, wherein said at least one complex weighting element comprises:
a first real weighting element interconnecting the in-phase channels of both the antenna ports with the in-phase channel of the beam port;
a second real weighting element interconnecting the quadrature channels of both the antenna ports with the in-phase channel of the beam port;
a third real weighting element interconnecting the in-phase channels of both the antenna ports with the quadrature channel of the beam port; and
a fourth real weighting element interconnecting the quadrature channels of both the antenna ports with the quadrature channel of the beam port;
wherein:
the first and fourth real weighting elements, and the second and third real weighting elements, have identical real weight; and
sign-changing elements are provided on the signal paths connecting the second real weighting element with the quadrature channel of the second antenna port, and the third real weighting element with the in-phase channel of the first antenna port.

4. A digital beam-forming network according to claim 2 having at least one complex weighting element of the plurality of complex weighting elements interconnecting a single antenna port with a first and a second beam ports, corresponding to respective antenna beams pointing toward directions which are symmetrical with respect to the symmetry axis, wherein said at least one complex weighting element comprises:
a first real weighting element, interconnecting the in-phase channel of the antenna port to the in-phase channels of both the beam ports;
a second real weighting element, interconnecting the quadrature channel of the antenna port to the in-phase channels of both the beam ports;
a third real weighting element, interconnecting the in-phase channel of the antenna port to the quadrature channels of both the beam ports; and a fourth real weighting element, interconnecting the quadrature channel of the antenna port to the quadrature channels of both the beam ports;

wherein:

the first and fourth real weighting elements, and the second and third real weighting elements, have identical real weight; and sign-changing elements are provided on the signal paths connecting the second real weighting element with the in-phase channel of the second beam port, the third real weighting element with the quadrature channel of the second beam port, and the third real weighting element with the in-phase channel of the antenna port.

5. A digital beam-forming network according to claim 2 having at least one complex weighting element of the plurality of complex weighting elements interconnecting a first and second antenna ports, to be associated to respective antenna elements which are arranged symmetrically with respect to the symmetry axis, with a first and a second beam ports, corresponding to respective antenna beams pointing toward directions which are symmetrical with respect to the symmetry axis, wherein said at least one complex weighting element comprises:

a first real weighting element interconnecting the in-phase channels of both the antenna port with the in-phase channels of both the beam ports;

a second real weighting element interconnecting the quadrature channels of both the antenna port with the in-phase channels of both the beam ports;

a third real weighting element interconnecting the in-phase channels of both the antenna port with the quadrature channels of both the beam ports; and a fourth real weighting element interconnecting the quadrature channels of both the antenna port with the quadrature channels of both the beam ports;

wherein:

the first and fourth real weighting elements, and the second and third real weighting elements, have identical real weight; and sign-changing elements are provided on the signal paths connecting the second real weighting element with the quadrature channel of the second antenna port, the second real weighting element with the in-phase channel of the second beam port, the third real weighting element with the in-phase channel of the first antenna port and the third real weighting element with the quadrature channel of the second beam port.

6. A digital beam-forming network according to claim 1, comprising a first set of $M_A \cdot N_A$ complex weighting elements interconnecting a single antenna port with a single beam port, a second set of $(M_S/2) \cdot N_A$ complex weighting elements interconnecting a single antenna port with two beam ports, corresponding to respective antenna beams pointing toward directions which are symmetrical with respect to the symmetry axis, a third set of $M_A \cdot (N_S/2)$ complex weighting elements interconnecting a single beam port with two antenna ports, to be associated to respective antenna elements which are arranged symmetrically with respect to the symmetry axis, and a fourth set of $(M_S/2) \cdot (N_S/2)$ complex weighting elements interconnecting two antenna ports, to be associated to respective antenna elements which are arranged symmetrically with respect to the symmetry axis, with two beam ports, corresponding to respective antenna beams pointing toward directions which are symmetrical with respect to the symmetry axis; wherein $M_S$, $M_A$, $N_S$ and $N_A$ are even integers and wherein $N_S+N_A=N$ and $M_S+M_A=M$.

7. A digital beam-forming network according to claim 1, wherein the antenna ports are input ports and the beam ports are output ports, and wherein complex weighting elements associated to a same beam ports are interconnected through summing nodes.

8. A digital beam-forming network according to claim 1, wherein the beam ports are input ports and the antenna ports are output ports, and wherein complex weighting elements associated to a same antenna ports are interconnected through summing nodes.

9. A digital beam-forming network according to claim 1, wherein the complex weighting elements have adjustable complex weights.

10. An array antenna (AA) comprising N antenna elements, $N_S$ of which are arranged according to an array pattern having a symmetry axis, $N_S$ being an even integer different from zero, and a digital beam-forming network according to claim 1.

11. A digital beam-forming network (DBF) for an array antenna having N>1 antenna ports, to be associated with respective antenna elements, and M≥1 beam ports, corresponding to respective antenna beams, the digital beam-forming network comprising:

a plurality of complex weighting elements interconnected through summing nodes; wherein at least one of the complex weighting elements is connected to either two antenna ports, to be associated with respective antenna elements which are arranged symmetrically with respect to a symmetry axis, or two beam ports corresponding to respective antenna beams pointing toward directions which are symmetrical with respect to a symmetry axis, or both, wherein each antenna port and each beam port comprises an in-phase and a quadrature channel, and wherein each complex weighting element comprises four real weighting elements.

12. A digital beam-forming network according to claim 11, having at least one complex weighting element of the plurality of complex weighting elements interconnecting a first and second antenna ports, to be associated with respective antenna elements which are arranged symmetrically with respect to the symmetry axis, with a single beam port, wherein said at least one complex weighting element comprises:

a first real weighting element interconnecting the in-phase channels of both the antenna ports with the in-phase channel of the beam port;

a second real weighting element interconnecting the quadrature channels of both the antenna ports with the in-phase channel of the beam port;

a third real weighting element interconnecting the in-phase channels of both the antenna ports with the quadrature channel of the beam port; and a fourth real weighting element interconnecting the quadrature channels of both the antenna ports with the quadrature channel of the beam port;

wherein:

the first and fourth real weighting elements, and the second and third real weighting elements, have identical real weight; and sign-changing elements are provided on the signal paths connecting the second real weighting element with the quadrature channel of the second antenna port, and the third real weighting element with the in-phase channel of the first antenna port.

13. A digital beam-forming network according to claim 11 having at least one complex weighting element of the plurality of complex weighting elements interconnecting a single antenna port with a first and a second beam ports, corresponding to respective antenna beams pointing toward directions which are symmetrical with respect to the symmetry axis, wherein said at least one complex weighting element comprises:
- a first real weighting element, interconnecting the in-phase channel of the antenna port to the in-phase channels of both the beam ports;
- a second real weighting element, interconnecting the quadrature channel of the antenna port to the in-phase channels of both the beam ports;
- a third real weighting element, interconnecting the in-phase channel of the antenna port to the quadrature channels of both the beam ports; and
- a fourth real weighting element, interconnecting the quadrature channel of the antenna port to the quadrature channels of both the beam ports;

wherein:
the first and fourth real weighting elements, and the second and third real weighting elements, have identical real weight; and
sign-changing elements are provided on the signal paths connecting the second real weighting element with the in-phase channel of the second beam port, the third real weighting element with the quadrature channel of the second beam port, and the third real weighting element with the in-phase channel of the antenna port.

14. A digital beam-forming network according to claim 11 having at least one complex weighting element of the plurality of complex weighting elements interconnecting a first and second antenna ports, to be associated to respective antenna elements which are arranged symmetrically with respect to the symmetry axis, with a first and a second beam ports, corresponding to respective antenna beams pointing toward directions which are symmetrical with respect to the symmetry axis, wherein said at least one complex weighting element comprises:
- a first real weighting element interconnecting the in-phase channels of both the antenna port with the in-phase channels of both the beam ports;
- a second real weighting element interconnecting the quadrature channels of both the antenna port with the in-phase channels of both the beam ports;
- a third real weighting element interconnecting the in-phase channels of both the antenna port with the quadrature channels of both the beam ports; and
- a fourth real weighting element interconnecting the quadrature channels of both the antenna port with the quadrature channels of both the beam ports;

wherein:
the first and fourth real weighting elements, and the second and third real weighting elements, have identical real weight; and
sign-changing elements are provided on the signal paths connecting the second real weighting element with the quadrature channel of the second antenna port, the second real weighting element with the in-phase channel of the second beam port, the third real weighting element with the in-phase channel of the first antenna port and the third real weighting element with the quadrature channel of the second beam port.

15. A digital beam-forming network (DBF) for an array antenna having $N>1$ antenna ports, to be associated with respective antenna elements, and $M \geq 1$ beam ports, corresponding to respective antenna beams, the digital beam-forming network comprising:
- a plurality of complex weighting elements interconnected through summing nodes; wherein at least one of the complex weighting elements is connected to either two antenna ports, to be associated with respective antenna elements which are arranged symmetrically with respect to a symmetry axis, or two beam ports corresponding to respective antenna beams pointing toward directions which are symmetrical with respect to a symmetry axis, or both; and
- a first set of $M_A \cdot N_A$ complex weighting elements interconnecting a single antenna port with a single beam port;
- a second set of $(M_S/2) \cdot N_A$ complex weighting elements interconnecting a single antenna port with two beam ports, corresponding to respective antenna beams pointing toward directions which are symmetrical with respect to the symmetry axis;
- a third set of $M_A \cdot (N_S/2)$ complex weighting elements interconnecting a single beam port with two antenna ports, to be associated to respective antenna elements which are arranged symmetrically with respect to the symmetry axis; and
- a fourth set of $(M_S/2) \cdot (N_S/2)$ complex weighting elements interconnecting two antenna ports, to be associated to respective antenna elements which are arranged symmetrically with respect to the symmetry axis, with two beam ports, corresponding to respective antenna beams pointing toward directions which are symmetrical with respect to the symmetry axis; wherein $M_S$, $M_A$, $N_S$ and $N_A$ are even integers and wherein $N_S+N_A=N$ and $M_S+M_A=M$.

* * * * *